US012677928B2

(12) United States Patent
Soskic et al.

(10) Patent No.: US 12,677,928 B2
(45) Date of Patent: Jul. 14, 2026

(54) MAKEUP RECOMMENDATION SYSTEM FOR A SMART COSMETIC DEVICE SYSTEM

(71) Applicant: HUMANOID LABS, INC, Los Angeles, CA (US)

(72) Inventors: Sandra Soskic, Los Angeles, CA (US); Pia Hunter, San Francisco, CA (US); Kristina Brown, Los Angeles, CA (US); Priyanka Kanse, Los Angeles, CA (US); Brett Wedewer, Los Angeles, CA (US); Kendra Iverson, Los Angeles, CA (US); Christine Van Rossum, Los Angeles, CA (US)

(73) Assignee: HUMANOID LABS, INC, Los Angeles, CA (US)

( * ) Notice: Subject to any disclaimer, the term of this patent is extended or adjusted under 35 U.S.C. 154(b) by 355 days.

(21) Appl. No.: 18/219,699

(22) Filed: Jul. 9, 2023

(65) Prior Publication Data

US 2024/0065419 A1 Feb. 29, 2024

Related U.S. Application Data

(60) Provisional application No. 63/402,405, filed on Aug. 30, 2022, provisional application No. 63/402,400, (Continued)

(51) Int. Cl.
| | |
|---|---|
| *A45D 44/00* | (2006.01) |
| *G06T 13/40* | (2011.01) |
| *G06T 19/00* | (2011.01) |

(52) U.S. Cl.
CPC ............ *A45D 44/005* (2013.01); *G06T 13/40* (2013.01); *G06T 19/006* (2013.01); *A45D 2044/007* (2013.01)

(58) Field of Classification Search
CPC ............ A45D 44/005; A45D 2044/007; G06T 13/40; G06T 19/006
See application file for complete search history.

(56) References Cited

U.S. PATENT DOCUMENTS

| | | |
|---|---|---|
| 6,168,590 B1 | 1/2001 | Neev |
| 10,885,697 B1 | 1/2021 | Viswanathan et al. |

(Continued)

OTHER PUBLICATIONS

Lulus, How-To: 3, 5 & 10 Minute Makeup Tutorial, Apr. 8, 2014, Lulus.com, pp. 1-3, at https://www.lulus.com/blog/beauty/lulus-how-to-3-5-10-minute-makeup-tutorial/ (last visited Sep. 26, 2025) (Year: 2014).*

*Primary Examiner* — Steve Rowland
(74) *Attorney, Agent, or Firm* — FP; Sikander M. Khan

(57) ABSTRACT

A method of streamlined selection and application of a makeup look involving personalized makeup look recommendations with respective step-by-step makeup routine instructions for executing a selected makeup look. A predictive model identifies one or more makeup look recommendations from a database of makeup looks to present to a user. Recommendations are generated from a combination of user demographic data, user-input preferences, social networking analytics (e.g., frequently used makeup looks among users such as "trending" makeup looks), and user behavioral history data obtained from a smart device application and a smart cosmetic device system. Each respective makeup look can be executed from a respective detailed tutorial guide comprising step-by-step instructions on how to apply cosmetic substances to achieve the respective makeup look.

20 Claims, 20 Drawing Sheets

Presentation of Makeup Look Recommendations System 200

Related U.S. Application Data filed on Aug. 30, 2022, provisional application No. 63/402,396, filed on Aug. 30, 2022.

(56) References Cited

U.S. PATENT DOCUMENTS

| | | |
|---|---|---|
| 11,069,094 B1 | 7/2021 | Evangelista et al. |
| 11,315,173 B2 | 4/2022 | Sartori Odizzio et al. |
| 11,580,682 B1 | 2/2023 | Luo et al. |
| 12,315,090 B1 | 5/2025 | Suresh et al. |
| 2002/0024528 A1* | 2/2002 | Lambertsen ....... G06Q 30/0601 |
| | | 345/646 |
| 2003/0063794 A1* | 4/2003 | Rubinstenn ............ A61B 5/446 |
| | | 382/154 |
| 2003/0065525 A1* | 4/2003 | Giacchetti ............ A61B 5/7264 |
| | | 705/1.1 |
| 2004/0110113 A1 | 6/2004 | Huang et al. |
| 2007/0167204 A1 | 7/2007 | Lyle et al. |
| 2010/0160849 A1 | 6/2010 | Barbour |
| 2016/0128919 A1* | 5/2016 | Sveine ................... A45D 40/30 |
| | | 401/268 |
| 2016/0143422 A1* | 5/2016 | Yamanashi ............. G06T 11/60 |
| | | 345/634 |
| 2017/0256084 A1* | 9/2017 | Iglehart .................. G06V 40/16 |
| 2018/0075523 A1 | 3/2018 | Sartori Odizzio et al. |
| 2019/0066348 A1* | 2/2019 | Jennings ............. G06V 40/165 |
| 2019/0213908 A1 | 7/2019 | Besen et al. |
| 2020/0196937 A1 | 6/2020 | Gopalan |
| 2020/0305579 A1 | 10/2020 | Yang et al. |
| 2021/0019926 A1 | 1/2021 | Hwang et al. |
| 2021/0307484 A1 | 10/2021 | Gouchtchina et al. |
| 2021/0407181 A1 | 12/2021 | Charraud et al. |
| 2022/0007813 A1 | 1/2022 | Spinelli et al. |
| 2022/0031229 A1 | 2/2022 | Lewis et al. |
| 2022/0101418 A1 | 3/2022 | Dehtiarov et al. |
| 2022/0101566 A1 | 3/2022 | Boscolo et al. |
| 2022/0202168 A1* | 6/2022 | Troutman ............... G06T 11/00 |
| 2022/0207802 A1* | 6/2022 | Troutman .............. G06N 3/045 |
| 2022/0215463 A1 | 7/2022 | Sartori Odizzio et al. |
| 2022/0240650 A1 | 8/2022 | Malaprade et al. |
| 2023/0066846 A1 | 3/2023 | Kelley et al. |
| 2025/0017355 A1 | 1/2025 | Charraud |

* cited by examiner

Usage Patterns 400

Internet of Things Connection Run on Cloud Environment Schematic 1000

1008

1006

1004

1002

Graphical User Interface Illustration 1900

1904

1902

MAKEUP RECOMMENDATION SYSTEM FOR A SMART COSMETIC DEVICE SYSTEM

PRIORITY APPLICATIONS

This U.S. Nonprovisional patent application claims the benefit of and priority to the following applications, which are incorporated by reference for all purposes as if fully set forth herein:

U.S. Provisional Patent Application No. 63/402,396, titled "SMART COSMETIC DEVICE SYSTEM," filed Aug. 30, 2022;

U.S. Provisional Patent Application No. 63/402,400, titled "MAKEUP RECOMMENDATION SYSTEM FOR A SMART COSMETIC DEVICE SYSTEM," filed Aug. 30, 2022; and U.S. Provisional Patent Application No. 63/402,405, titled "INTERREALITY COSMETICS FOR A SMART COSMETIC DEVICE SYSTEM," filed Aug. 30, 2022.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks.

CONTEMPORANEOUSLY FILED NONPROVISIONAL APPLICATIONS INCORPORATED BY REFERENCE

The following contemporaneously filed applications are incorporated by reference for all purposes as if fully set forth herein:

U.S. Nonprovisional patent application Ser. No. 18/219,698 titled "SMART COSMETIC DEVICE SYSTEM," filed on Jul. 9, 2023; and U.S. Nonprovisional patent application Ser. No. 18/219,700 titled "INTERREALITY COSMETICS FOR A SMART COSMETIC DEVICE SYSTEM," filed on Jul. 9, 2023.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Makeup application is a complex field of art requiring both sufficient knowledge and technical skill. A broad range of makeup application techniques and styles exist, often requiring a time-consuming exploration process to learn a repertoire of makeup looks. A combination of technical innovation within the field of cosmetic products and the rise of accessibility to educational information on makeup application via Internet resources has led to an overwhelming cosmetic landscape, particularly for an average layperson without professional training. Experimentation with cosmetic products is time- and cost-intensive, typically without any option for the consumer to know the outcome of product application until time and cost have already been spent, leading to frustration and waste.

Furthermore, even once a makeup routine has been established with consumer-preferred cosmetic products, the makeup application process is still exceedingly time-consuming. A consumer may search through dozens of makeup look tutorials or inspiration posts on social media and entertainment resources to find a makeup look that fits their desired outcome and available cosmetic products. The process of applying makeup requires close study of a tutorial or inspiration photo (often looking at similar steps repeatedly to grasp the intricacies of replicating a technique fully), trial and error of technique replication, and finding the correct applicator tools, or adequate substitutions for the proper applicator tools, out of a plethora of applicator options. Despite one's best effort, following a makeup routine may not achieve desired results due to vague instructions, challenging techniques, lack of available requirements, or facial differences between an online model and the consumer.

A wide variety of cosmetic products are available to reduce barriers to accessible makeup application. Cosmetic substances with tone-matching chemistry, such as skin tone match foundation and pH-sensitive lipstick, aim to simplify the makeup selection process by creating universally flattering makeup. These products are rare, limited in range, and often primarily cater to fair skin tones. Novel application technologies include airbrush machines, intelligent makeup assistants (e.g., personalized cosmetic substance dispensing systems, cosmetic devices with Internet of Things (IoT) capability for makeup application tracking), and educational software such as smartphone applications with tutorial content. Only a subset of these technologies are available to laypeople compared to professional makeup artists, and predominantly fail to address more than a niche fraction of the overall makeup accessibility dilemma. Historically, the cosmetic landscape lacks a comprehensive smart makeup application system that fully addresses accessibility and efficiency of each step of the makeup application process.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
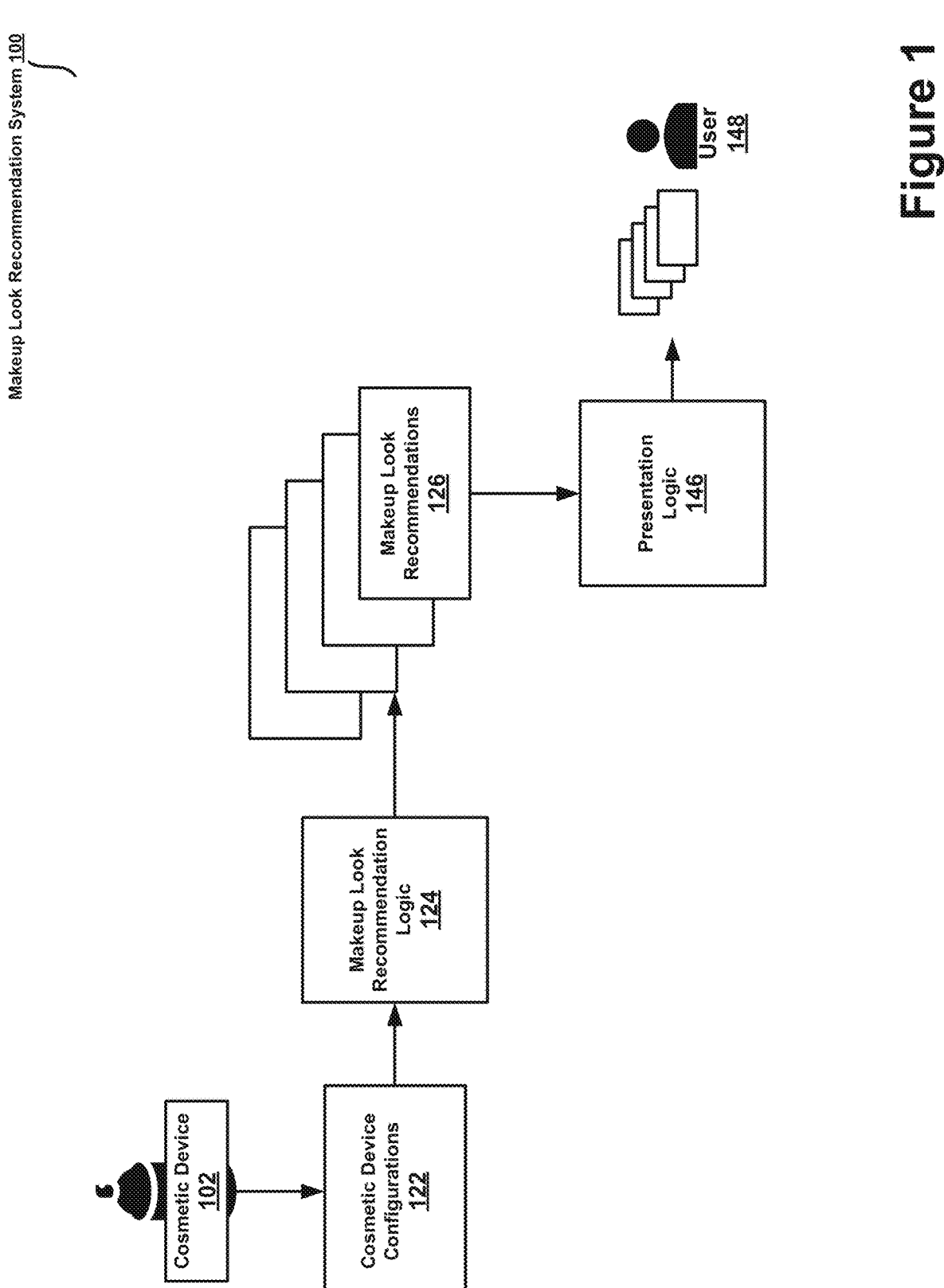
FIG. 1 is a schematic diagram of a makeup look recommendation system.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

The technology disclosed can improve the user experience for cosmetic application. The technology disclosed achieves this goal by improving the efficiency of the identification, selection, and application of makeup looks through IoT, artificial intelligence, and web application development technologies. The smart cosmetic delivery system's collaborative interface provides to a user introduces a heightened degree of cosmetic skill previously unavailable to the average consumer.

The beauty industry grew from USD 483 billion in 2020 to USD 511 billion in 2021, and with a global annual compounded growth rate of 4.75%, the industry is predicted to expand to USD 716 billion by 2025, per Reports Global. Expansion of the beauty sector has invited innovation in the forms of educational material, inclusivity (e.g., market audience diversification, environmental awareness, and a new focus on health and safety), and technological advancement. In particular, the cosmetics industry (demonstrating a growth rate of +32% in segment revenue within the beauty industry) has introduced a swath of novel developments aggregating research advances in biology and technology. For instance, beauty brands have leveraged hardware advancements such as near-range communication and "smart home" technology to allow for deeper integration of a user's personal cosmetic application experience with online resources, as well as software advancements such as augmented reality (AR) and machine learning prediction integration for digital platforms to further increase the personalization of the cosmetic application experience.

Of note, artificial intelligence models are increasingly popular for beauty applications. The use of an artificial intelligence model for beauty recommendations may be advantageous to a user for various reasons, including, but not limited to, accessibility to high-quality beauty products and information from home, cost-effective product selection, and streamlined cosmetic application. Artificial intelligence programs can be implemented to advise a user on makeup decisions for a particular skin type, color scheme, or boldness level. A user skilled in the art will appreciate that skin type, color scheme, and boldness level are listed explicitly as examples, and a wide range of additional features may be implemented for training purposes of a beauty-targeted artificial intelligence model. The technology disclosed comprises an artificial intelligence model trained to predict suitable makeup look routines for a user in response to user-specific behavioral history data, user-input assessments, and data trends from a plurality of users within a given demographic.

In some implementations of the technology disclosed, the makeup look recommendation system is a classification model (e.g., discriminant analyses, regression, decision trees, and so on). In other implementations of the technology disclosed, the makeup look recommendation system is a form of cluster analysis (e.g., hierarchical clustering, K-means, density-based spatial clustering of applications with noise (DBSCAN), and so on). In yet other technology implementations disclosed, other pattern recognition analyses may be implemented, such as ensemble learning (e.g., boosting, bagging, and so on), Bayesian networks, or Markov random fields. In any of the implementations mentioned above, neural networks and deep learning may be applied as decision-making tools.

A makeup look recommendation comprises a wide range of descriptive features corresponding to the rendering (e.g., application and implementation), visualization (e.g., color scheme, complexity, and placement areas), or interpretation (e.g., aesthetic vibe, appropriate occasions, and social media trending patterns) of the particular makeup look. These features may be combined into a feature vector to be processed as input for a makeup look recommendation system. Each respective feature is weighted by a respective feature importance, where the magnitude of a feature importance value proportionally relates to the influence a respective feature has on the output of the makeup look recommendation system. Feature importance weights can be learned by a machine learning model, or they may be manually edited. Thus, a makeup look recommendation system may be configured to process inputs with a larger weight on a particular feature within a plurality of features (e.g., prioritizing color in a generated makeup look recommendations over aesthetic vibe). The resulting model allows for a heightened accessibility to makeup ideas and inspiration, regardless of a user's cosmetic knowledge or skill set.

A countless number of cosmetic products and cosmetic applicators exist on the market. A typical makeup routine for a full-face makeup look can take a large array of tools to complete skin coverage, eye, and lip makeup application. The option of a multifunctional cosmetic device that saves time, space, money, and user effort is highly appealing to a consumer. The majority of cosmetic products and cosmetic applicators are frequently single-function items (e.g., a cosmetic substance used exclusively as lipstick or a brush that is used solely for facial contouring).

The narrow range of functionality for cosmetic products stems from their specialization for a particular placement area upon the face or a specific application style. Cosmetic products and applicators for skin complexion coverage come in a plethora of options. Primer, concealer, foundation, and contour products may come in a gel, liquid, powder, or cream format with infinite target functions (e.g., oil control, hypoallergenic, degree of coverage, moisturizing, sun protection, et cetera) and are typically applied in layers. Each layer will have a respective cosmetic product and one or more corresponding applicators (e.g., brushes, sponges, and fingerprints), wherein cosmetic product instructions are often ambiguous, and applicators are used in combination. A typical makeup user may own over a dozen skin complexion coverage cosmetic products (e.g., one or more of a primer, tinted moisturizer, under-eye concealer, blemish concealer, foundation, cheek contour product, nose contour product, blush, bronzer, highlighter, and so on) and one or more corresponding applicators.

Other cosmetic products follow a similar trend. Eye makeup, lip makeup, and niche products such as acne care, eyebrow grooming, or special event cosmetic products are more complex than skin complexion coverage cosmetic products. Furthermore, cosmetic products and applicators are disposable or of limited use. Curating a collection of cosmetic products is energy-intensive, high cost, and storage-intensive. The technology disclosed comprises many implementations of a comprehensive cosmetic device and cosmetic product application system wherein a single applicator can apply a broad range of cosmetic products to a wide range of placement areas. The cosmetic device is an Internet of Things (IoT) device functioning as a multi-use cosmetic applicator and a smart applicator capable of communicating with a computer system to produce personalized makeup recommendations, tutorials, and a detailed cosmetic history for a user.

The IoT is an ecosystem of interconnected, uniquely-identified computers, mechanical and digital devices, or other objects that possess the ability to transfer data over a network to other IoT devices. Any object that can be assigned an Internet Protocol (IP) address and transfer data over a network is considered an IoT device, also referred to as a "smart device." Users may interact with the IoT ecosystem, but human intervention is not required for IoT device function. IoT devices employ embedded systems to acquire, transmit, and respond to data from their environments; wherein data is transmitted to a cloud server accessible to the other IoT devices within the IoT ecosystem (or a subset of the IoT ecosystem) via connection to an edge gateway (e.g., via Bluetooth or another proprietary protocol). The technology disclosed may serve as a single IoT device (i.e., a particular cosmetic device of a particular configuration) connected to a mobile IoT app (i.e., a mobile device application responsible for regulating the IoT ecosystem) or as a network of two or more IoT devices (i.e., a first cosmetic device of a first particular configuration, a second cosmetic device of a second particular configuration, and so on).

In addition to modulation of IoT device function and collection of data, mobile IoT applications can enhance IoT systems by providing trend analysis, artificial intelligence prediction, ambient intelligence features, and additional IoT analytics tools. IoT analytics processes may be carried out on a cloud server or locally on an endpoint. Data acquired by IoT device sensors can be analyzed by real-time, predictive, and descriptive analytics.

Combined, these analyses offer valuable insight into usage trends that inform predictive and recommendation services offered to a user, leading to an enhanced user experience. Artificial intelligence models can "learn" trends from sensor data collected by an IoT device (i.e., the model is trained). The trained model can be used to predict future outputs (i.e., the model is tested). For instance, an IoT cosmetic device may collect data about a user's usage history, where each usage instance is a data observation and each measured property of an instance is a feature (e.g., frequency of device usage, the pattern of use, volume of cosmetic substance dispensed, color of cosmetic substance dispensed, and so on). An artificial intelligence model may be trained on the cosmetic device usage history of a particular user to predict desirable makeup look recommendations for the particular user. Artificial intelligence, as well as other predictive analytics such as data mining and regression modeling, may be used in combination with descriptive analytics (e.g., trend analysis of cosmetic substance color selections over eight weeks of usage history data) and real-time analytics (e.g., recommendation of makeup looks realized by a particular color in response to the cosmetic device detecting a loaded cartridge containing the cosmetic substance of the particular color).

In addition to artificial intelligence features, IoT devices provide enhanced user experience due to their capacity for ambient intelligence. Ambient intelligence builds upon existing artificial intelligence and sensor technology to process input from the surrounding environment and output an appropriate, relevant response. IoT devices utilize ambient intelligence processes to present personalized, contextually-specific responses to a user. Technologies such as close-range communication (e.g., Bluetooth, near-field communication, radio frequency identification, and so on), biometrics, and sensors (e.g., accelerometers, photodetectors, proximity sensors, and other devices designed to respond to a physical phenomenon) augment and interact with artificial intelligence processes to provide highly-personalized responses to external stimuli and improve user experience. As an example, an IoT cosmetic device may offer suggestions for bold makeup looks in response to detecting a cartridge containing a red cosmetic substance or provide suggestions for makeup looks of a specific intricacy (e.g., a makeup look that can be completed in five minutes) based on a user's usage history at a particular time of day.

The challenge of recommending highly-personalized makeup looks for a particular user involves high-dimensional big data analysis. As a result, machine learning algorithms are well-suited to identify patterns within cosmetic user data, compare a particular user's preferences with a plurality of other users within the user's demographic (e.g., processing aggregated data describing usage patterns of users aged 18-24 to produce makeup look recommendations for a single particular user aged 19), and predict a makeup look recommendation for a particular user in response to processing the particular user's input data (e.g., usage history, user-specified features, and so on).

Artificial intelligence models are frequently implemented with the goals of increasing accessibility, decreasing barriers to resources, and improving quality of life. An opportunity arises to implement such technologies within the field of cosmetics to overcome the time-complexity and ability-related barriers for the average consumer.

For much of the history of cosmetic application, makeup products have been limited in accessibility and range of customizable options for the consumer. Despite wide popularity, products are often limited by financial, demographic, educational, and time limitations. Cosmetics can become quite expensive, exacerbated by the necessity for a wide range of individual products and applicators that are frequently single-use only. Previously, beauty products (of note, but not limited to, makeup) have been limited in marketing and representation to women-particularly, fair-skinned women. While the diversity of product availability has improved, minority demographics may experience a higher degree of difficulty finding personalized educational content.

Moreover, a discrepancy often exists between the makeup looks available to the average consumer compared to makeup looks represented in the media by celebrities and social media influencers. Defining looks of a current beauty standard may only be realized with the proper combination of professional training, financial freedom, and product availability. While the rise of Internet resources has substantially improved this dilemma (e.g., YouTube tutorials, Instagram and Pinterest "beauty inspo," activism campaigns for inclusive cosmetics, and so on), creating a genuinely accessible cosmetics environment requires a multi-faceted approach.

One could consider the barriers to cosmetic application in the following stages: research, purchase, consumption, and presentation. The typical makeup consumer performs substantial research before purchasing a cosmetic product, as the cosmetic landscape has grown exponentially in terms of available products (e.g., formulation, brand, desired effect, affordability, and so on). The research process is time-consuming and limited by prior knowledge (i.e., advanced information can be challenging to access without proper guidance or information provided by previous experience). Moreover, very few centralized resources exist. As a result, a makeup consumer can quickly become overwhelmed by the range of information scattered across countless websites, magazines, film and music media, and interpersonal sharing of anecdotes. Once the consumer selects a desired product or aesthetic, obtaining the required components can be inconvenient and complex. The consumer must identify a supplier, additional required tools and applicators, compatibility requirements with other products, and instructional material for the selected product-guidance material for each listed component may be ambiguous or subjective to a particular audience.

Realization of a desired makeup look can take many iterations of trial-and-error attempts. Users may follow tutorials (which are not personalized and may-or-may-not be directed towards the user's specific racial or gender demographic), free-hand experiment, or pay for professional guidance to achieve their desired final result. Consumers often find that their initially selected cosmetic products or applicators do not sufficiently meet their needs for their desired aesthetic or determine that their desired aesthetic is unrealistic in terms of difficulty, financial cost, or time requirements. Following the realization of a makeup look, a user often intends to share their results with their social network. Beauty presentation has become increasingly digitalized during the $21^{st}$ century in response to the rise of social media; notably, Generation Z (the demographic succeeding Millennials, generally considered to be born in 1997 onward) is defined by their deep integration within the digital world and unique perspective on the importance of online presence. However, consumers of all ages may strongly prioritize and value the ability to present their achieved look, share their cosmetic knowledge and results, and connect with other cosmetic users.

The technology disclosed addresses current needs within the cosmetic industry by improving accessibility within each stage of the makeup application process. The technology disclosed comprises a comprehensive smart cosmetic device system configured to reduce barriers to the cosmetic application process's research, purchasing, consumption, and presentation components. A mobile device application comprising a database of makeup routines, a makeup look recommendation artificial intelligence model, Metaverse integration, and social networking services interfaces with one or more IoT cosmetic devices comprising a cosmetic substance cartridge and dispensing system. Collaboration between the makeup routine instructional tutorial within the application and the ergonomic, user-friendly cosmetic device allows for simple application of cosmetic products to achieve makeup looks of any complexity level, regardless of user experience.

The makeup look recommendation system provides a centralized database of makeup looks for a user, including a wide range of feature filters (e.g., complexity, aesthetic vibe, color components, and so on) and a corresponding routine tutorial for each look. Users receive highly-personalized makeup look recommendations as the makeup look recommendation system learns the user's preferences and behavioral history, significantly decreasing the time and energy required to identify desired makeup looks and aesthetics. The comprehensive nature of the system allows for a user to purchase the exact cosmetic substances and application tools to achieve each look, removing any need for extensive research or wasteful purchasing on behalf of the user. Moreover, corresponding augmented reality (AR), virtual reality (VR), and mixed reality (MR) components within the Metaverse application feature allow a user to experiment with new makeup looks without time- or cost-prohibitive barriers. Once a look has been applied, either upon the user's physical appearance or within the Metaverse, users can easily share their results with a broad social network within the mobile device application.

The technology disclosed describes various implementations of the cosmetic device and its functional components in further detail.

System Architecture

FIG. 1 is a schematic diagram of a makeup look recommendation system 100. A cosmetic device 102 comprises a plurality of configurations. Data specifying at least one configuration in the plurality of configurations 122 of the cosmetic device is processed as input for a makeup look recommendation logic 124. The makeup look recommendation logic 124 generates one or more makeup look recommendations 126. Presentation logic 146, in communication with the makeup look recommendation logic 124, is configured to present the makeup look recommendations 126 to a user 148.

The cosmetic device is configured to dispense a cosmetic substance. The plurality of configurations of the cosmetic device include data describing a particular cosmetic substance formula, usage patterns of a particular cosmetic substance, and a design configuration of the cosmetic substance. A respective design configuration of the cosmetic device will possess a respective form configured for a respective function. In one implementation of the technology disclosed, the design configuration of the cosmetic device is a spray canister configured to dispense the cosmetic substance as a mist of liquid particles, such as an aerosol spray (e.g., airbrush makeup systems). In another implementation of the technology disclosed, the design configuration of the cosmetic device is a pen configured to dispense liquid in a controlled fine-line makeup application (e.g., gel or felt-tip liner tools). In yet another implementation of the technology disclosed, the design configuration of the cosmetic device is a tape dispenser configured to dispense the cosmetic substance onto an adhesive material to be affixed onto human skin (e.g., medical-grade makeup tape for creating defined makeup styles or patterned adhesive). By comprising a variety of implementations possessing a broad range of high-specialized functionalities within a compact system, the technology disclosed serves as a comprehensive cosmetic application system capable of creating a limitless number of makeup looks. A cosmetic device of a particular configuration may be used in isolation, or in combination with one or more other cosmetic devices of other respective configurations (e.g., a makeup look wherein respective components of the look are respectively implemented by a spray canister, pen, and tape dispenser).

In other implementations of the technology disclosed, the design configuration of the cosmetic device is further augmented by one or more adaptors. Adaptors are configured to apply the cosmetic substance in a manner such that dispersion and application of the cosmetic substance are modified from the base design configuration (i.e., a spray canister, pen, or tape dispenser without any adaptors). Adaptors include spray nozzle attachments, brushes, and sponges. Spray nozzle attachments augment the spray pattern in which the cosmetic substance is dispersed (e.g., a broader range or more concentrated spray). Brush and sponge adaptors augment the blend and consistency with which the cosmetic substance is dispersed by the cosmetic device. In some implementations of the technology disclosed, stencils are implemented as adaptors wherein one or more shaped stencils are configured to apply the cosmetic substance to create detailed designs upon the skin with the cosmetic substance. A person skilled in the art will appreciate that additional implementations of the technology disclosed with further design configurations of the cosmetic device (i.e., alternative base configurations intended to apply cosmetic substances with alternative consistencies, coverage, or means of application) and design configurations of the adaptors are possible (e.g., additional brush shapes, nozzle attachments, and so on).

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Figure 2:
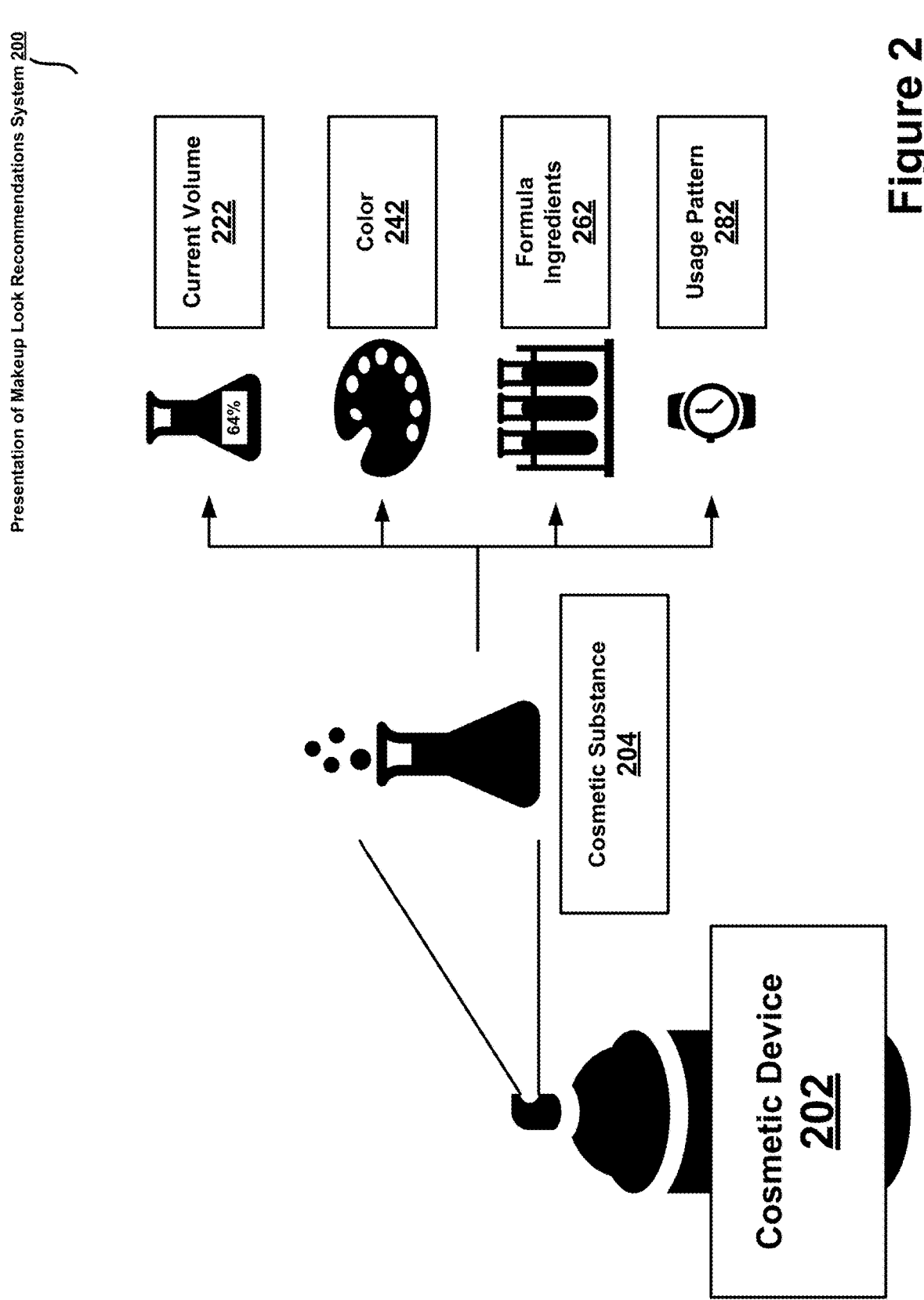
FIG. 2 is an illustrative example of cosmetic substance features within the plurality of device configurations.

FIG. 2 is an illustrative example of cosmetic substance features within the plurality of device configurations 200. The cosmetic device configurations 122 in FIG. 1 comprise particular cosmetic substance configurations in addition to particular structural configurations wherein the output of the makeup look recommendation logic 124 is partially influenced by the cosmetic substance configuration. A cartridge comprising the cosmetic substance 204 is loaded within the cosmetic device 202. In some implementations of the technology disclosed, a plurality of cartridges is loaded within the cosmetic device 202. The cosmetic substance 204 has a current volume 222, wherein the current volume 222 of the cosmetic substance 204 within the cartridge may be monitored by the cosmetic device 202. The color 242 of the cosmetic substance 204 may also be monitored by the cosmetic device. In some implementations of the technology disclosed, the cosmetic device 202 monitors the characteristics of the cartridge via near-range communication (e.g., NFC tags, Bluetooth, and so on).

The formula ingredients 262 of the cosmetic substance 204 determine one or more features in addition to color, such as finish (e.g., gloss, matte, or glitter finish) and target function (e.g., hypoallergenic formula, redness reduction formula, pigment retention formula, or waterproof formula) wherein a first cosmetic substance and a second cosmetic substance can have the same color but differing formula ingredients (e.g., a plurality of foundation cosmetic substances comprising an identical shade wherein only one foundation cosmetic substance is formulated for sensitive skin; a plurality of lip tint cosmetic substances comprising an identical shade wherein only one is formulated for a matte finish).

The cosmetic device 202 collects data on the usage pattern 282 of a given cosmetic substance 204. The usage pattern tracks days of week when a particular cosmetic substance is dispensed and times of day when a particular cosmetic substance is dispensed (i.e., a cosmetic substance is dispensed at a higher frequency at a respective time of day on a respective day of week as compared to other cosmetic substances).

In one implementation of the technology disclosed, one or more device configurations pertaining to the cosmetic substance 204 correspond to a cosmetic substance currently loaded in the cosmetic device. In another implementation of the technology disclosed, one or more device configurations pertaining to the cosmetic substance 204 correspond to two or more cosmetic substances concurrently loaded in the cosmetic device. In yet another implementation of the technology disclosed, one or more device configurations pertaining to the cosmetic substance 204 correspond to one or more cosmetic substances previously loaded in the cosmetic device.

As data specifying configurations of a cosmetic device are processed by the makeup look recommendation logic 124, the makeup look recommendation logic 124 learns a history and usage pattern of one or more cosmetic substances currently and previously loaded in the cosmetic device and generates one or more makeup look recommendations implementable by the plurality of cosmetic substances currently loaded in the cosmetic device or previously loaded as determined by the cosmetic device usage history (e.g., a cosmetic device is currently loaded with a blue cosmetic substance and has previously been loaded with a pink cosmetic substance, therefore a makeup look is recommended that is realized by the color blue and/or the color pink).

A cosmetic substance currently loaded in the cosmetic device is prioritized over a cosmetic substance previously loaded in the cosmetic device (e.g., a cosmetic device is currently loaded with a blue cosmetic substance and has previously been loaded with a pink cosmetic substance, therefore makeup looks realized by the color blue will be statistically more likely to be recommended by the makeup look recommendation logic 124 than makeup looks realized by the color pink). In many implementations of the technology disclosed, a makeup look realized by a color refers to the color of a cosmetic substance applied within the makeup look. In some other implementations, the term "to be realized by" may refer to a similar color to previously implemented cosmetic substances, a coordinated color (e.g., a user's eye color, a user's outfit color, media inspiration, and so on), or a complementary color (e.g., a color that is aesthetically complementary, but not the same, as a color otherwise implemented to a user's overall appearance).

Application of a Makeup Look

The discussion thus far has focused on the system components used to apply a particular makeup look recommendation. Now, the method of applying a particular makeup look is described in further detail.

Figure 3:
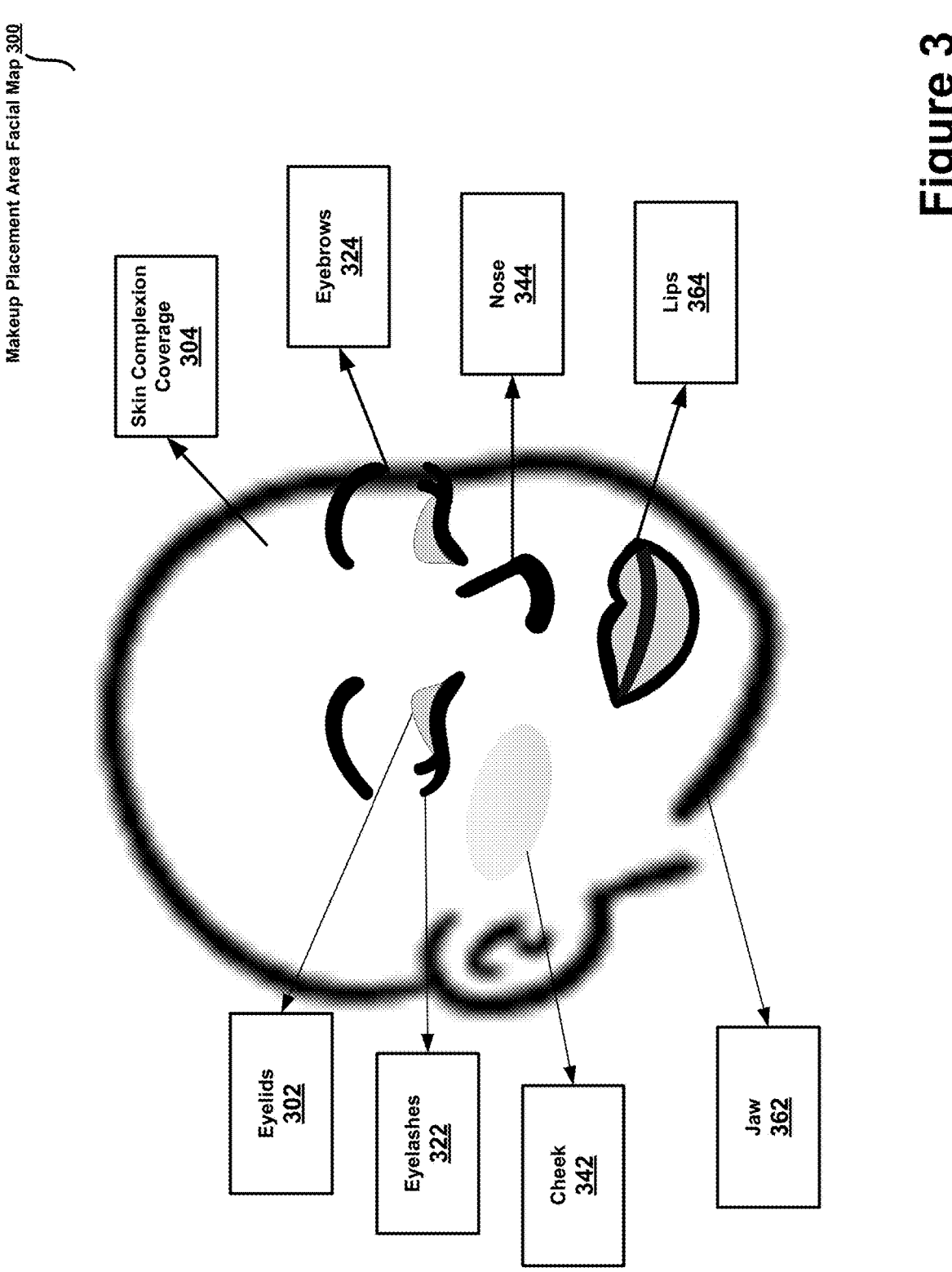
FIG. 3 is an illustration of a human facial map with highlighted makeup placement areas.

FIG. 3 is an illustration of a human facial map 300 with highlighted makeup placement areas. A makeup look recommendation comprises a particular configuration of makeup placement, style, and color within respective target placement areas on a human face. A person skilled in the art will recognize that the examples given for cosmetic substance formula and placement are purely for teaching purposes, and a wide range of alternative makeup placement options exist. A cosmetic substance may be applied to the eyelids 302, wherein the application is characterized by shade, finish, coverage, and detail. In one implementation of the technology disclosed, the cosmetic substance is a colorless priming, moisturizing, or setting formula. In another implementation of the technology disclosed, the cosmetic substance is a pigmented substance intended to render a design in the form of eyeshadow upon the eyelids 302 using a spray canister or a spray canister augmented by adaptors. In yet another implementation of the technology disclosed, the cosmetic substance is a pigmented substance intended to render a definition line in the form of eyeliner along the lash line or water line of the eye using a pen.

A cosmetic substance applied to the eyelids 302 comprises characteristics including, but not limited to, shade, finish (e.g., high pigment, glitter, or anti-creasing), formula ingredients particular to one or more target functions (e.g., waterproofing, longtime wear ability, or maintenance of a particular formulation (e.g., vegan, hypoallergenic or gluten-free formula). Each particular cosmetic substance formula for eyelids 302 application will have one or more particular required design configurations for application (e.g., a pigmented eyeliner wherein the pigmented eyeliner must be applied using a pen comprising a felt-tip brush). In some implementations of the technology disclosed, a makeup look eyelids 302 component may require one cosmetic substance as a design configuration of the cosmetic device within the plurality of design configurations. In other implementations of the technology disclosed, a makeup look eyelids 302 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the eyelids 302 component of the makeup look is included within the makeup look recommendation.

A cosmetic substance may be applied as a form of skin complexion coverage 304. Cosmetic substances applied to the skin can be implemented as coverage for the entire face, neck, areas of concern (e.g., blemishes) or specific target placement sub-areas (e.g., contouring of the cheekbone or highlighting of the nose bridge). Cosmetic substances applied for skin complexion coverage 304 fall under one or more of a plurality of target functions including moisturization, priming (i.e., blending, surface smoothing, redness reduction, providing a base layer with compatible chemistry with future layers such as a silicone primer prior to silicone-based pigmented foundation versus an oil primer prior to oil-based pigmented foundation), pigmented foundation, concealing agents, contouring agents (e.g., bronzer) or setting agents (e.g., waterproofing or smudge-prevention agents dispensed as a fine powder or aerosolized liquid particles).

To achieve a particular target function with a skin complexion coverage 304 substance, a target combination of formula ingredients is required. Cosmetic substances intended for skin complexion coverage 304 comprise characteristics including, but not limited to, a shade, one or more formula ingredients particular to a target function (e.g., oil-control, blendability, or buildability) and formula ingredients necessary to fulfill maintenance of a particular formulation (e.g., vegan, hypoallergenic, or gluten-free formula).

In one implementation of the technology disclosed, a makeup look skin complexion coverage 304 component may require one cosmetic substance as a design configuration of the cosmetic device within the plurality of design configurations. In other implementations of the technology disclosed, a makeup look skin complexion coverage 304 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the skin complexion coverage 304 component of the makeup look is included within the makeup look recommendation.

A cosmetic substance may be applied to the eyelashes 322 as a mascara, wherein the cosmetic substance comprises characteristics including, but not limited to, shade, formula ingredients particular to one or more target functions (e.g., waterproofing, anti-smudging, volumizing, lengthening, or curling) and formula ingredients necessary to fulfill maintenance of a particular formulation (e.g., vegan, hypoallergenic, or gluten-free formula). In one implementation of the technology disclosed, application of a cosmetic substance to the eyelashes 322 may require a particular design configuration wherein the cosmetic device is augmented by one or more adaptors, wherein the compatible adaptors comprise spoolie brushes, eyelash separators, and eyelash curlers. In some implementations of the technology disclosed, a cosmetic substance applied to the eyelashes 322 is applied to the top eyelashes but not the bottom eyelashes. In other implementations of the technology disclosed, a cosmetic substance applied to the eyelashes 322 is applied to the bottom eyelashes but not the top eyelashes. In other implementations of the technology disclosed, a cosmetic substance applied to the eyelashes 322 is applied to both the top and bottom eyelashes.

In one implementation of the technology disclosed, a makeup look eyelashes 322 component may require one cosmetic substance as a design configuration of the cosmetic device within the plurality of design configurations. In other implementations of the technology disclosed, a makeup look eyelashes 322 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the eyelashes 322 component of the makeup look is included within the makeup look recommendation.

A cosmetic substance may be applied for definition of the eyebrows 324, wherein the cosmetic substance comprises characteristics including, but not limited to, shade, formula ingredients particular to a target function (e.g., wear longevity or pigmentation contrast), and formula ingredients necessary to fulfill maintenance of a particular formulation (e.g., vegan, hypoallergenic, or gluten-free formula). Cosmetic substances applied to eyebrows 324 fall under one or more of a plurality of target functions including definition (i.e., shaping and tinting using pigmentation), lifting (i.e., giving the appearance of a heightened brow bone to contour facial structure), and lamination (i.e., sculpting and setting the eyebrow hair in a desired shape).

In one implementation of the technology disclosed, application of a cosmetic substance to the eyebrows 324 may require a device configuration comprising a spray canister. In another implementation of the technology disclosed, application of a cosmetic substance to the eyebrows 342 may require a device configuration comprising a spray canister augmented by the use of a particular adaptor brush (e.g., a stiff narrow brush or a spoolie brush) or stencil. In other implementations of the technology disclosed, application of a cosmetic substance to the eyebrows 324 may require a device configuration comprising a pen. In another implementation of the technology disclosed, application of a cosmetic substance to the eyebrows 324 may require a device configuration comprising a pen augmented by the use of a particular adaptor brush (e.g., a stiff narrow brush or a spoolie brush) or stencil.

In one implementation of the technology disclosed, a makeup look eyebrows 324 component may require one cosmetic substance as a design configuration of the cosmetic device within the plurality of design configurations. In other implementations of the technology disclosed, a makeup look eyebrows 324 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the eyebrows 324 component of the makeup look is included within the makeup look recommendation.

A cosmetic substance may be applied to the cheek 342, wherein the cosmetic substance comprises characteristics including, but not limited to, shade, formula ingredients particular to one or more target functions (e.g., contouring or highlighting) and formula ingredients necessary to fulfill maintenance of a particular formulation (e.g., vegan, hypoallergenic, or gluten-free formula).

While similar to cosmetic substance application for skin complexion coverage 304, specialized target functions of cosmetic substances exist in contrast to complexion coverage cosmetic substances. In place of or in addition to skin complexion coverage cosmetic substances applied to the face, a cosmetic substance applied to the cheek 342 can be implemented as a means of contouring, highlighting, or adding pigmentation to the cheekbone and surrounding areas. The processes of contouring or highlighting the skin covering the cheekbone fall under one or more of a plurality of target functions including altering the appearance of bone structure (i.e., to give the impression of a sharper bone structure, higher bone structure, or thinner face), altering the appearance of skin pigmentation (e.g., introducing a bronzed pigment to give the impression of tanned skin or introducing a red pigment to give the impression of a warmer undertone), or altering the appearance of skin texture (e.g., introducing a reflective highlight pigment to give the impression of a hydrated or glowing appearance).

In one implementation of the technology disclosed, application of a cosmetic substance to the cheek 342 may require a device configuration comprising a spray canister. In another implementation of the technology disclosed, application of a cosmetic substance to the cheek 342 may require a device configuration comprising a spray canister augmented by the use of a particular adaptor brush (e.g., a wide soft brush or a blending sponge) or stencil.

In one implementation of the technology disclosed, a makeup look cheek 342 component may require one cosmetic substance as a design configuration of the cosmetic device within the plurality of design configurations. In other implementations of the technology disclosed, a makeup look cheek 342 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the cheek 342 component of the makeup look is included within the makeup look recommendation.

A cosmetic substance may be applied to the nose 344, wherein the cosmetic substance comprises characteristics including, but not limited to, shade, formula ingredients particular to one or more target functions (e.g., contouring or highlighting) and formula ingredients necessary to fulfill maintenance of a particular formulation (e.g., vegan, hypo-allergenic, or gluten-free formula).

While similar to cosmetic substance application for skin complexion coverage 304, specialized target functions of cosmetic substances exist in contrast to complexion coverage cosmetic substances. In place of or in addition to skin complexion coverage cosmetic substances applied to the face, a cosmetic substance applied to the nose 344 can be implemented as a means of contouring, highlighting, or adding pigmentation to the nose bridge and surrounding areas. The process of contouring or highlighting the skin covering the nasal bone and cartilage fall under one or more of a plurality of target functions including altering the appearance of bone structure or skin pigmentation (e.g., to give the impression of a different nose size or shape, introducing a red pigment to give the impression of a warmer undertime, or a bright pigment to highlight the tip of the nose).

In one implementation of the technology disclosed, application of a cosmetic substance to the nose 344 may require a device configuration comprising a spray canister. In another implementation of the technology disclosed, application of a cosmetic substance to the nose 344 may require a device configuration comprising a spray canister augmented by the use of a particular adaptor brush (e.g., a wide soft brush or a blending sponge) or stencil. In yet another implementation of the technology disclosed, application of a cosmetic substance to the nose 344 may require a device configuration comprising a pen.

A cosmetic substance may be applied to the jaw 362, wherein the cosmetic substance comprises characteristics including, but not limited to, shade, formula ingredients particular to one or more target functions (e.g., contouring or highlighting) and formula ingredients necessary to fulfill maintenance of a particular formulation (e.g., vegan, hypo-allergenic, or gluten-free formula).

While similar to cosmetic substance application for skin complexion coverage 304, specialized target functions of cosmetic substances exist in contrast to complexion coverage cosmetic substances. In place of or in addition to skin complexion coverage cosmetic substances applied to the face, a cosmetic substance applied to the jaw 362 can be implemented as a means of contouring, highlighting, or adding pigmentation to the jawline and surrounding areas. The processes of contouring or highlighting the skin covering the jawbone fall under one or more of a plurality of target functions including altering the appearance of the jawline and neck (i.e., to give the impression of a more defined jawline or thinner neck).

In one implementation of the technology disclosed, application of a cosmetic substance to the jaw 362 may require a device configuration comprising a spray canister. In another implementation of the technology disclosed, application of a cosmetic substance to the jaw 362 may require a device configuration comprising a spray canister augmented by the use of a particular adaptor brush (e.g., a wide soft brush or a blending sponge) or stencil.

In one implementation of the technology disclosed, a makeup look jaw 362 component may require one cosmetic substance as a design configuration of the cosmetic device within the plurality of design configurations. In other implementations of the technology disclosed, a makeup look jaw 362 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the jaw 362 component of the makeup look is included within the makeup look recommendation.

A cosmetic substance may be applied to the lips 364, wherein the cosmetic substance comprises characteristics including shade, finish (e.g., gloss, glitter, or matte), formula ingredients particular to one or more target functions (e.g., high pigmentation, lip shaping, or hydration) and formula ingredients necessary to fulfill maintenance of a particular formulation (e.g., vegan, hypoallergenic, or gluten-free formula). In one implementation of the technology disclosed, application of a cosmetic substance to the lips 364 may require a particular design configuration wherein the cosmetic device is augmented by one or more adaptors, wherein the compatible adaptors comprises a doe foot applicator, lip brush, or sponge. In some implementations of the technology disclosed, the cosmetic device is a spray canister used to apply full coverage pigmentation to the lips. In other implementations of the technology disclosed, the cosmetic device is a pen used to apply a line on specific target placement sub-areas (e.g., outer edge of the lips, corner of the lips, or cupid's bow).

In one implementation of the technology disclosed, a makeup look lips 364 component may require one cosmetic substance as a design configuration of the cosmetic device within the plurality of design configurations. In other implementations of the technology disclosed, a makeup look lips 364 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) and step-by-step instructions for implementation of the lips 364 component of the makeup look is included within the makeup look recommendation.

In some implementations of the technology disclosed, a makeup look may contain cosmetic substance application for all placement areas. In other implementations of the technology disclosed, a makeup look may contain cosmetic substance application for a subset of one or more placement areas within the plurality of placement areas (e.g., skin complexion coverage and lips makeup application, but makeup is not applied to the eyes). A first makeup look and a second makeup look may be distinct in at least one placement area application and may share similarity in at least one placement area application (e.g., a first makeup look and a second makeup look both comprising pink cosmetic substance application on the lips; however, the first makeup look does not comprise cosmetic substance application to the eyelids whereas the second makeup look does). For the facial map shown in FIG. 3, a makeup look is illustrated wherein a pink cosmetic substance is applied to the eyelids 302, cheek 342, and lips 364.

Makeup Look Recommendations

In many implementations of the technology disclosed, makeup looks applied using the disclosed system are obtained from a recommendation. The discussion now turns to one embodiment of the process of recommending a particular makeup look in further detail.

Figure 4:
FIG. 4 is a schematic diagram of usage pattern timeframes and occasions.

FIG. 4 is a schematic diagram 400 of usage pattern timeframes and occasions. A weekly calendar 402 is shown with days of the week comprising Sunday, Monday, Tuesday, Wednesday, Thursday, Friday, and Saturday. Each day is divided into two time periods, wherein daytime is represented by a sun symbol and nighttime is represented by a moon symbol. A monthly calendar 422 is shown with various occasions on specific days, wherein a professional engagement in the first week of the month is represented by an icon of two people speaking at a desk, a party in the second week is represented by a balloon symbol, and the Christmas holiday in the fourth week is represented by a snowman symbol. A plurality of makeup looks are illustrated on facial maps, wherein a particular makeup look conforms to a particular time of a particular day or a particular makeup look is associated with a particular occasion. In one implementation of the technology disclosed, a makeup look recommendation may propose a makeup look that conforms to a particular time of a particular day, wherein a makeup look that conforms to the particular time of the particular day comprises at least one cosmetic substance with a usage pattern such that the frequency of the cosmetic substance is higher at that particular time of the particular day than other times of other days. In another implementation of the technology disclosed, a makeup look recommendation may propose a makeup look that conforms to a particular occasion, wherein a makeup look that conforms to the particular occasion comprises at least one cosmetic substance with a usage pattern such that the frequency of the cosmetic substance is higher at that particular occasion than other occasions.

Makeup look 404, comprising pink cosmetic substance applied to the eyelids and lips, conforms to daytime on a Tuesday. For makeup look 404 to conform to daytime on a Tuesday, the pink cosmetic substance usage pattern comprises a high usage frequency during daytime hours on Tuesdays. As a result, the makeup look recommendation logic 124 will be statistically more likely to generate at least one makeup look recommendation that proposes a makeup look that comprises a pink cosmetic substance applied to the eyelids and lips during the daytime on Tuesdays.

Makeup look 406, comprising blue cosmetic substance applied to the eyelids and pink cosmetic substance applied to the lips, conforms to daytime on a Thursday. Despite sharing similarity with makeup look 404 in that both makeup look 404 and makeup look 406 comprise pink cosmetic substance applied to the lips, blue cosmetic substance applied to the eyelids comprises a higher usage frequency during daytime hours on Thursdays than pink cosmetic substance applied to the eyes. As a result, the makeup look recommendation logic 124 will be statistically more likely to generate at least one makeup look recommendation that proposes a makeup look that comprises a pink cosmetic substance applied to the lips and a blue cosmetic substance applied to the eyelids during the daytime on Thursdays.

Makeup look 408, comprising lilac cosmetic substance applied to the eyelids and lips, conforms to nighttime on a Saturday. Makeup look 408 conforms to both a different time of day and day of week than makeup looks 404 and 408. For makeup look 404 to conform to nighttime on a Saturday, the lilac cosmetic substance usage pattern comprises a high usage frequency during nighttime hours on Saturdays. As a result, the makeup look recommendation logic 124 will be statistically more likely to generate at least one makeup look recommendation that proposes a makeup look that comprises a lilac cosmetic substance applied to the eyelids and lips.

Makeup look 424, comprising mauve cosmetic substance applied to the lips, conforms to a professional engagement occasion. For makeup look 424 to conform to a professional engagement occasion, the mauve cosmetic substance usage pattern comprises a high usage frequency for professional engagement occasions in one implementation of the technology disclosed. In another implementation of the technology disclosed, makeup look 424 conforms to a professional engagement occasion due to the low usage frequency for any cosmetic substance applied to placement areas other than the lips. In some implementations of the technology disclosed, makeup look 424 conforms to a professional engagement occasion due to both the high usage frequency of a cosmetic substance applied to the lips and the low usage frequency for any cosmetic substance applied to placement areas other than the lips in combination. As a result, the makeup look recommendation logic 124 will be statistically more likely to generate at least one makeup look recommendation that proposes a makeup look that comprises a mauve cosmetic substance applied to the lips for a professional occasion.

Makeup look 426, comprising teal cosmetic substance applied to the eyelids and pink cosmetic substance applied to both the cheeks and lips, conforms to a party occasion. For makeup look 426 to conform to a party occasion, at least one respective cosmetic substance applied to a respective placement area within makeup look 426 must have a usage pattern comprising a high usage frequency respective to the corresponding placement area illustrated for makeup look 426 in some implementations of the technology disclosed. In other implementations of the technology disclosed, each cosmetic substance applied to a respective placement area within makeup look 426 must have a usage pattern comprising a high usage frequency respective to the corresponding placement area illustrated for makeup look 426. As a result, the makeup look recommendation logic 124 will be statistically more likely to generate at least one makeup look recommendation that proposes a makeup look that comprises a teal cosmetic substance applied to the eyelids and/or pink cosmetic substance applied to both the cheeks and/or lips for a party occasion.

Makeup look 428, comprising red cosmetic substance and green cosmetic substance applied to the eyelids, pink cosmetic substance applied to the lips, and blue cosmetic substance applied to the skin as a snowflake design, conforms to a Christmas holiday occasion. For makeup look 428 to conform to a party occasion, at least one respective cosmetic substance applied to a respective placement area within makeup look 428 must have a usage pattern comprising a high usage frequency respective to the corresponding placement area illustrated for makeup look 428 in some implementations of the technology disclosed. In other implementations of the technology disclosed, each cosmetic substance applied to a respective placement area within makeup look 428 must have a usage pattern comprising a high usage frequency respective to the corresponding placement area illustrated for makeup look 428. As a result, the makeup look recommendation logic 124 will be statistically more likely to generate at least one makeup look recommendation that proposes a makeup look that comprises a red cosmetic substance and green cosmetic substance applied to the eyelids and/or pink cosmetic substance applied to both the lips and/or blue cosmetic substance applied as a snow-flake design on the skin for a Christmas holiday occasion.

Figure 5:
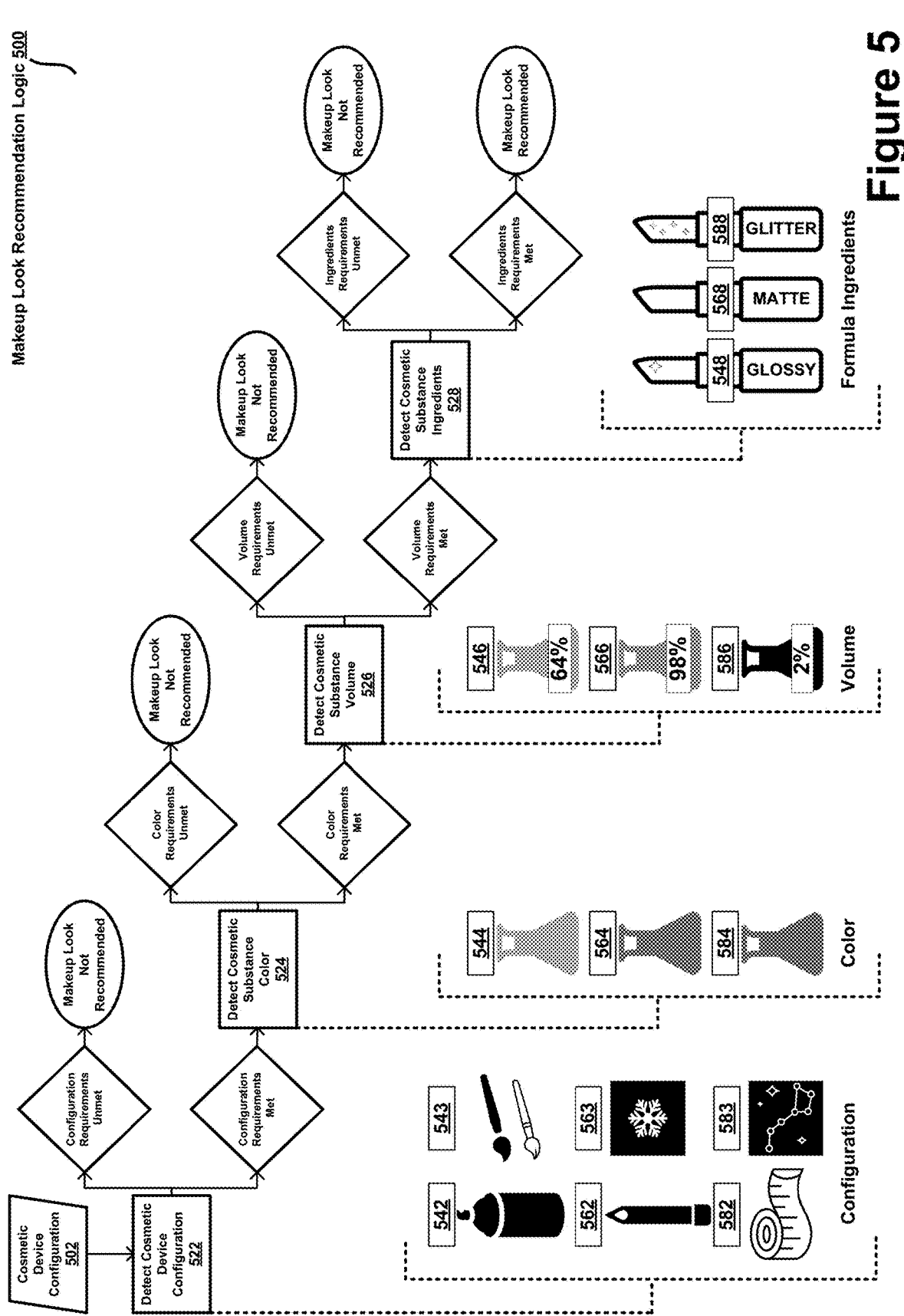
FIG. 5 is a flow diagram of the makeup look recommendation logic.

In addition to recommendations for a particular time or occasion, makeup look recommendations also depend upon features associated with device configuration. FIG. 5 is a flow diagram 500 of the makeup look recommendation logic. The makeup look recommendation logic 500 proposes at least one makeup look recommendation that proposes a makeup look that is implementable by a particular design configuration, realized by the color of a particular cosmetic substance, creatable with the current volume of the particular cosmetic substance, and producible by the ingredients of the particular cosmetic substance. In some implementations of the technology disclosed, the cosmetic substance is dictated by the usage pattern corresponding to a specific time of a specific day or a specific occasion. In other implementations of the technology disclosed, the cosmetic substance is a currently loaded cosmetic substance. In other implementations of the technology disclosed, the cosmetic substance is a previously loaded cosmetic substance. In some implementations of the technology disclosed, the cosmetic substance currently loaded is prioritized by the makeup look recommendation logic 500 over a cosmetic substance previously loaded or a cosmetic substance that conforms to a particular usage pattern unless otherwise specified.

A cosmetic device configuration 502 undergoes a detection process 522. The process of detecting the cosmetic device configuration 522 may detect device configurations such as a spray canister 542, a pen 562, a tape dispenser 582, brush adaptors 543, or stencils such as the snowflake stencil 563 or the constellation stencil 583. If the device configuration requirements are not met for a particular makeup look (i.e., the particular makeup look comprises application of a cosmetic substance using a device configuration which is not available), the makeup look is not recommended. If the device configuration requirements are met for the particular makeup look, the color of the cosmetic substance is detected.

The process of detecting the cosmetic substance color 524 may detect a variety of colors including a blue cosmetic substance 544, a purple cosmetic substance 564, or a green cosmetic substance 584. If the cosmetic substance color requirements are not met for the particular makeup look (i.e., the particular makeup look comprises application of a cosmetic substance using a cosmetic substance comprising a color which is not available), the makeup look is not recommended. If the cosmetic substance color requirements are met for the particular makeup look, the volume of the cosmetic substance is detected.

The process of detecting the cosmetic substance volume 526 may detect a range of volumes from 0% to 100% including green cosmetic substance 546 with a current volume level of 64%, pink cosmetic substance 566 with a current volume level of 98%, or black cosmetic substance 584 with a current volume level of 2%. If the cosmetic substance color requirements are not met for the particular makeup look (i.e., the particular makeup look comprises application of a cosmetic substance using a cosmetic substance wherein the remaining volume in the cosmetic substance cartridge is not sufficient), the makeup look is not recommended. If the cosmetic substance color requirements are met for the particular makeup look, the ingredients of the cosmetic substance are detected.

The process of detecting the cosmetic substance ingredients 528 at least one ingredient within a plurality of ingredients including glossy cosmetic substance 548, matte cosmetic substance 568, or glitter cosmetic substance 588. If the cosmetic substance ingredient requirements are not met for the particular makeup look (i.e., the particular makeup look comprises application of a cosmetic substance using a cosmetic substance wherein the makeup look is not producible by the cosmetic substance ingredients) the makeup look is not recommended. If the cosmetic substance ingredient requirements are met for the particular makeup look, the makeup look will be recommended.

The following section describes a wide range of examples of the disclosed technology within the context of various input features to the makeup look recommendation system.

Figure 6:
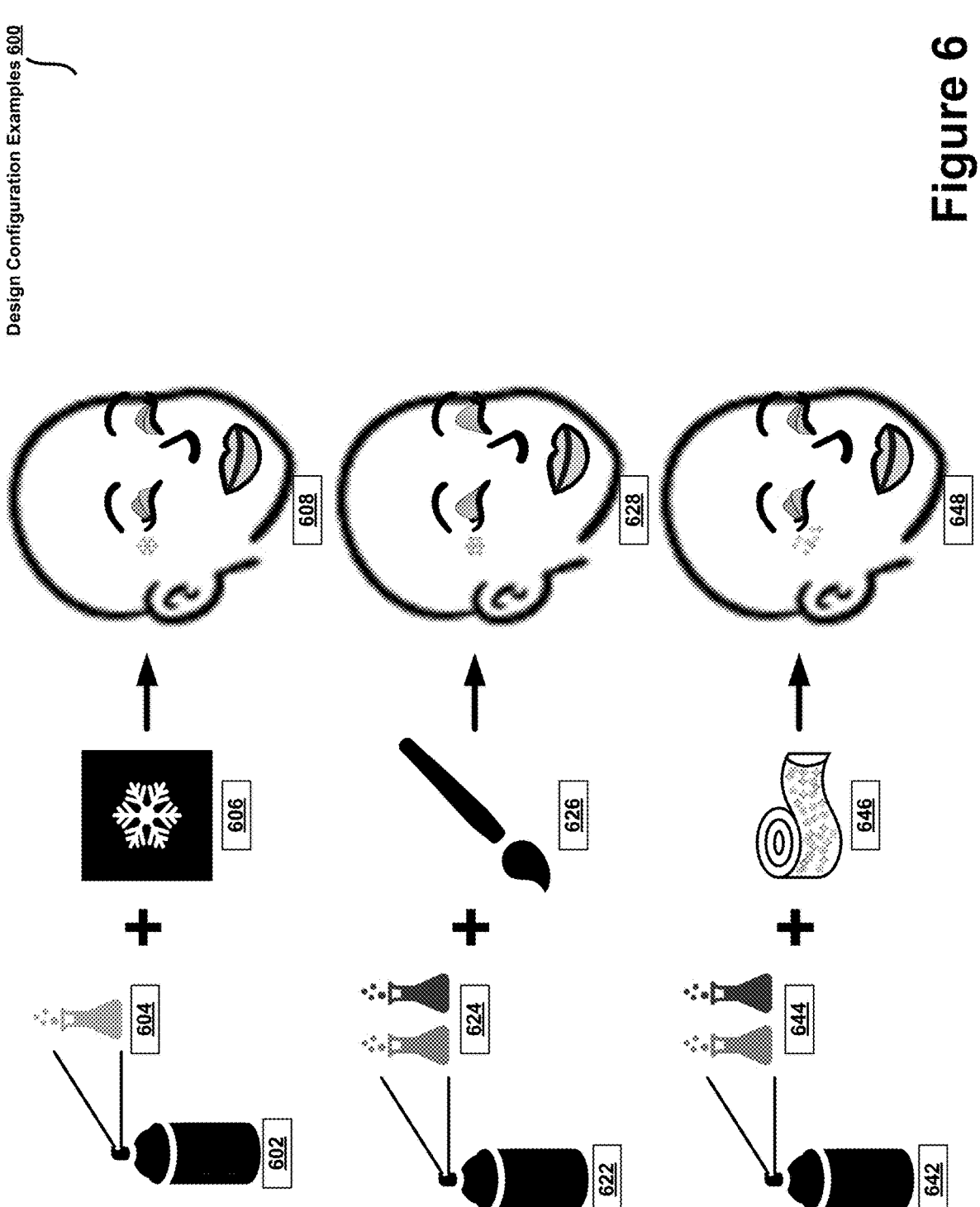
FIG. 6 is an illustration of design configuration examples.

FIG. 6 is an illustration 600 of design configuration examples. Facial maps corresponding to makeup looks 608, 628, and 648 respectively demonstrate modifications of a makeup look in response to an adaptor augmenting the device configuration. Makeup looks 608, 628, and 648 share similar composition of cosmetic substance application to the eyelids and lips with a snowflake design applied to the skin in terms of color, but differ in certain design or format components due to the implementation of respective adaptors. To achieve makeup look 608, cosmetic device 602 is currently loaded with blue cosmetic substance 604 and paired with a snowflake design stencil 606 to create the blue snowflake design on the facial map skin. To achieve makeup look 628, cosmetic device 622 is concurrently loaded with green cosmetic substance and red cosmetic substance 624 and paired with a brush adaptor 626 to create the blended eyeshadow design applied to the eyelids. To achieve makeup look 648, cosmetic device 642 is concurrently loaded with green cosmetic substance and red cosmetic substance 644 and paired with glitter snowflake design tape 646 to create the glitter snowflake pattern on the facial map skin.

Figure 7:
FIG. 7 is an illustration of makeup look requirements.
Figure 7:
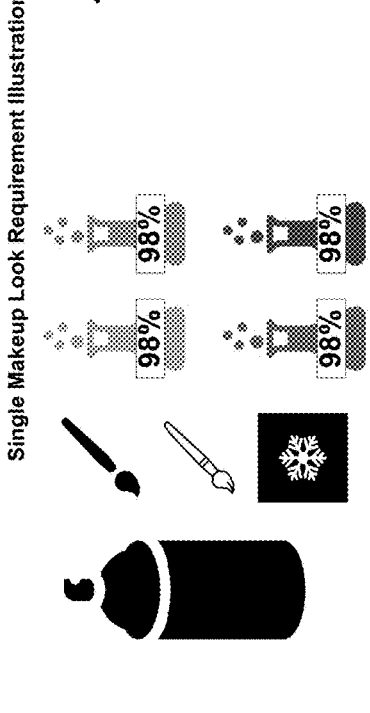
Figure 7:
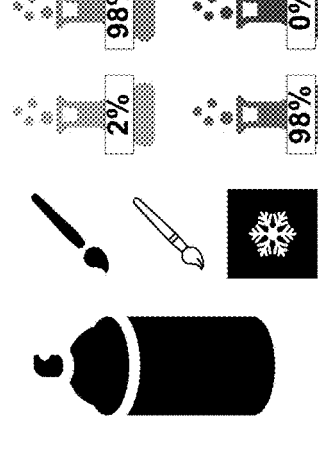
Figure 7:
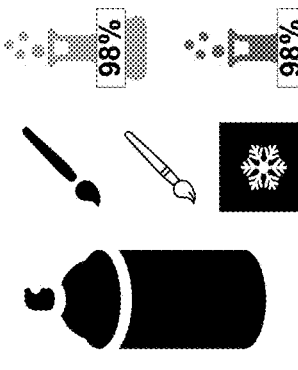
Figure 7:
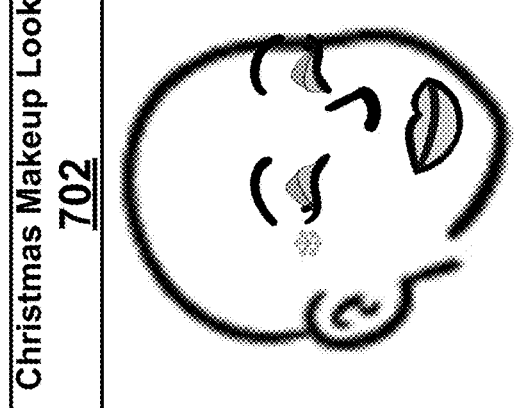

FIG. 7 is an illustration 700 of makeup look requirements. Christmas makeup look 702 comprises a blue snowflake design applied to the skin, red cosmetic substance and green cosmetic substance applied to the eyelids, and pink cosmetic substance applied to the lips. The requirements for the Christmas makeup look 702 comprise pink cosmetic substance, red cosmetic substance, green cosmetic substance, blue cosmetic substance, a small flat brush adaptor, a small fan brush adaptor, and a snowflake stencil.

Scenario A 704 comprises a spray canister, a small flat brush adaptor, a small fan brush adaptor, a snowflake stencil, blue cosmetic substance, pink cosmetic substance, red cosmetic substance, green cosmetic substance, and blue cosmetic substances wherein all cosmetic substances possess 98% of their respective volumes remaining. The requirements for Christmas makeup look 702 are met, therefore the Christmas makeup look 702 is implementable by the device configurations corresponding to Scenario A 704 and the Christmas makeup look 702 may be recommended by the makeup recommendation logic in response to processing the device configurations corresponding to Scenario A 704 as input.

Scenario B 724 comprises a spray canister, a small flat brush adaptor, a small fan brush adaptor, a snowflake stencil, blue cosmetic substance possessing 2% volume remaining, pink cosmetic substance possessing 98% volume remaining, red cosmetic substance possessing 0% volume remaining, and green cosmetic substance. The volume requirements for the blue cosmetic substance and red cosmetic substance respectively are not met, therefore the Christmas look 702 is not implementable by the device configurations corresponding to Scenario B 724 and the Christmas makeup look 702 may not be recommended by the makeup recommendation logic in response to processing the device configurations corresponding to Scenario B 724 as input.

Scenario C 744 comprises a spray canister, a small flat brush adaptor, a small fan brush adaptor, a snowflake stencil, blue cosmetic substance, brown cosmetic substance, red cosmetic substance, green cosmetic substance, and blue cosmetic substances wherein all cosmetic substances possess 98% of their respective volumes remaining. In one implementation of the technology disclosed, a robustness component allows for a makeup look to be implemented despite one or more device configurations not being met wherein user-driven modifications of a particular step in the step-by-step instructions for the makeup look do not disrupt future steps. Despite Scenario C 744 lacking a pink cosmetic substance, a user may choose to apply brown cosmetic substance to their lips in place of a pink cosmetic substance. Application of a brown cosmetic substance to the lips will not necessarily prevent Christmas makeup look 702 from being recommended by the makeup recommendation logic in response to processing the device configurations corresponding to Scenario C 744 as input, as all other device configurations in Scenario C 744 have been met.

Figure 8:
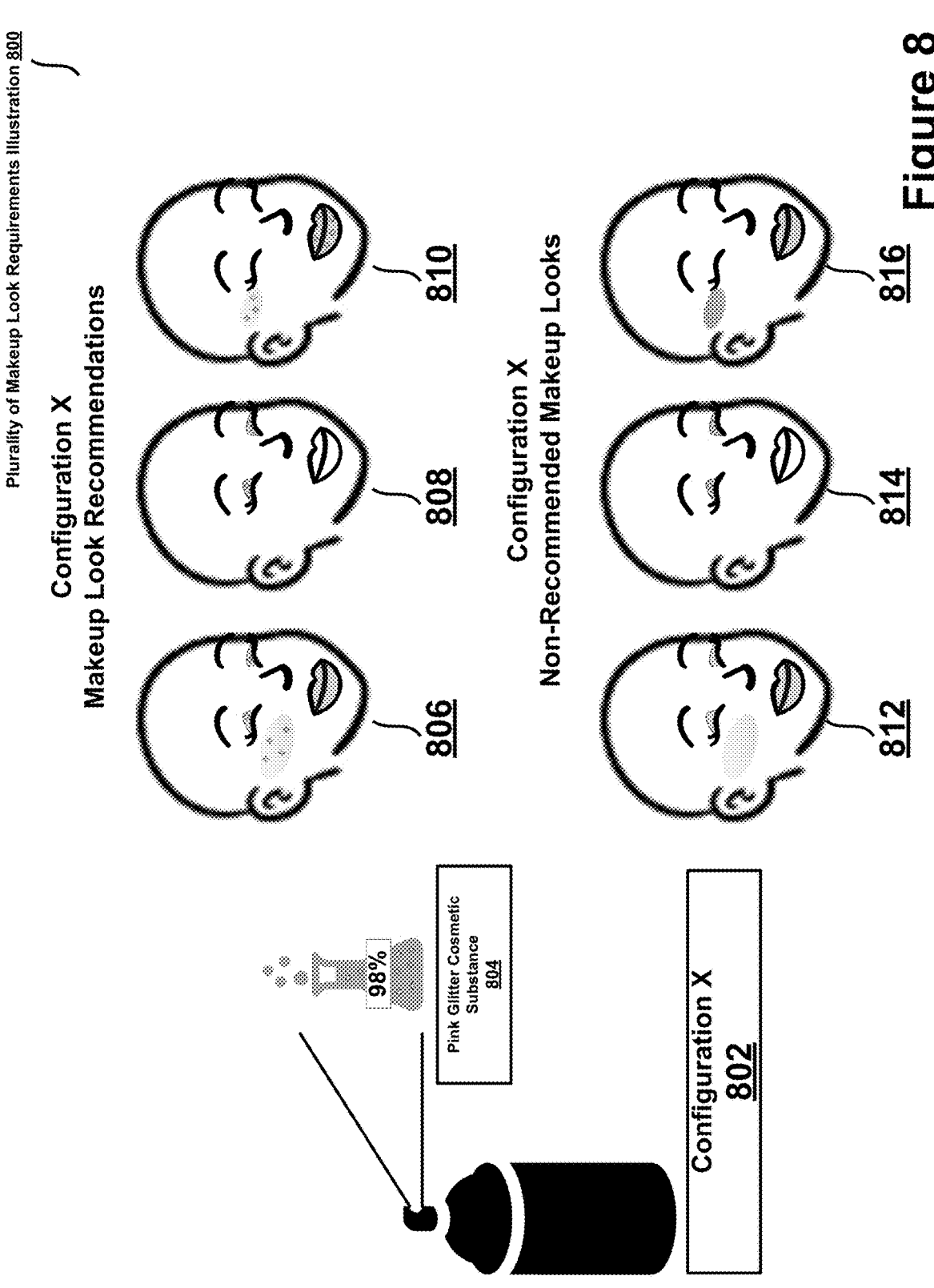
FIG. 8 is an illustration of a plurality of makeup look recommendations for a given design configuration.

FIG. 8 is an illustration 800 of a plurality of makeup look recommendations for a given design configuration. In the illustration, a cosmetic device with configuration X 802 is currently loaded with a pink glitter cosmetic substance 804 with 98% volume remaining. A plurality of makeup look recommendations 806, 808, and 810 are recommended as output of the makeup look recommendation logic 500 in response to processing configuration X 802 as input. Makeup look recommendation 806 proposes a makeup look comprising pink glitter cosmetic substance applied to the cheeks and a matte pink cosmetic substance to the lips. Makeup look recommendation 808 proposes a makeup look comprising pink glitter cosmetic substance applied to the eyelids. Makeup look recommendation 810 proposes a makeup look comprising pink glitter cosmetic substance applied to the skin and to the lips. All three makeup look recommendations 806, 808, and 810 comprise pink glitter cosmetic substance 804 applied to at least one placement area.

A plurality of makeup look recommendations 812, 814, and 816 are not recommended as output of the makeup look recommendation logic 500 in response to processing configuration X 802 as input. Makeup look recommendation 812 resembles makeup look recommendation 806 in that a pink cosmetic substance is applied to both the cheeks and the lips in each respective makeup look recommendation. However, makeup look recommendation 812 comprises only matte pink cosmetic substance, and therefore is not implementable by Configuration X 802. Makeup look recommendation 814 resembles makeup look recommendation 808 in that a glitter cosmetic substance is applied to the eyelids in each respective makeup look recommendation. However, makeup look recommendation 812 comprises only blue glitter cosmetic substance, and therefore is not implementable by Configuration X 802. Makeup look recommendation 816 resembles makeup look recommendation 806 in that a cosmetic substance is applied to the same skin placement sub-area and the lips in each respective makeup look recommendation. However, makeup look recommendation 812 comprises only purple cosmetic substance, and therefore is not implementable by Configuration X 802. In some implementations of the technology disclosed, makeup look recommendations 812, 814, and 816 are implementable with modifications to a cosmetic substance application from a particular cosmetic substance color or finish to the pink glitter cosmetic substance 804 due to the robustness component of the makeup look recommendation logic 500.

System Environments

The described system above may be run on a cloud environment or on an endpoint. The two scenarios are elaborated upon below.

Figure 9:
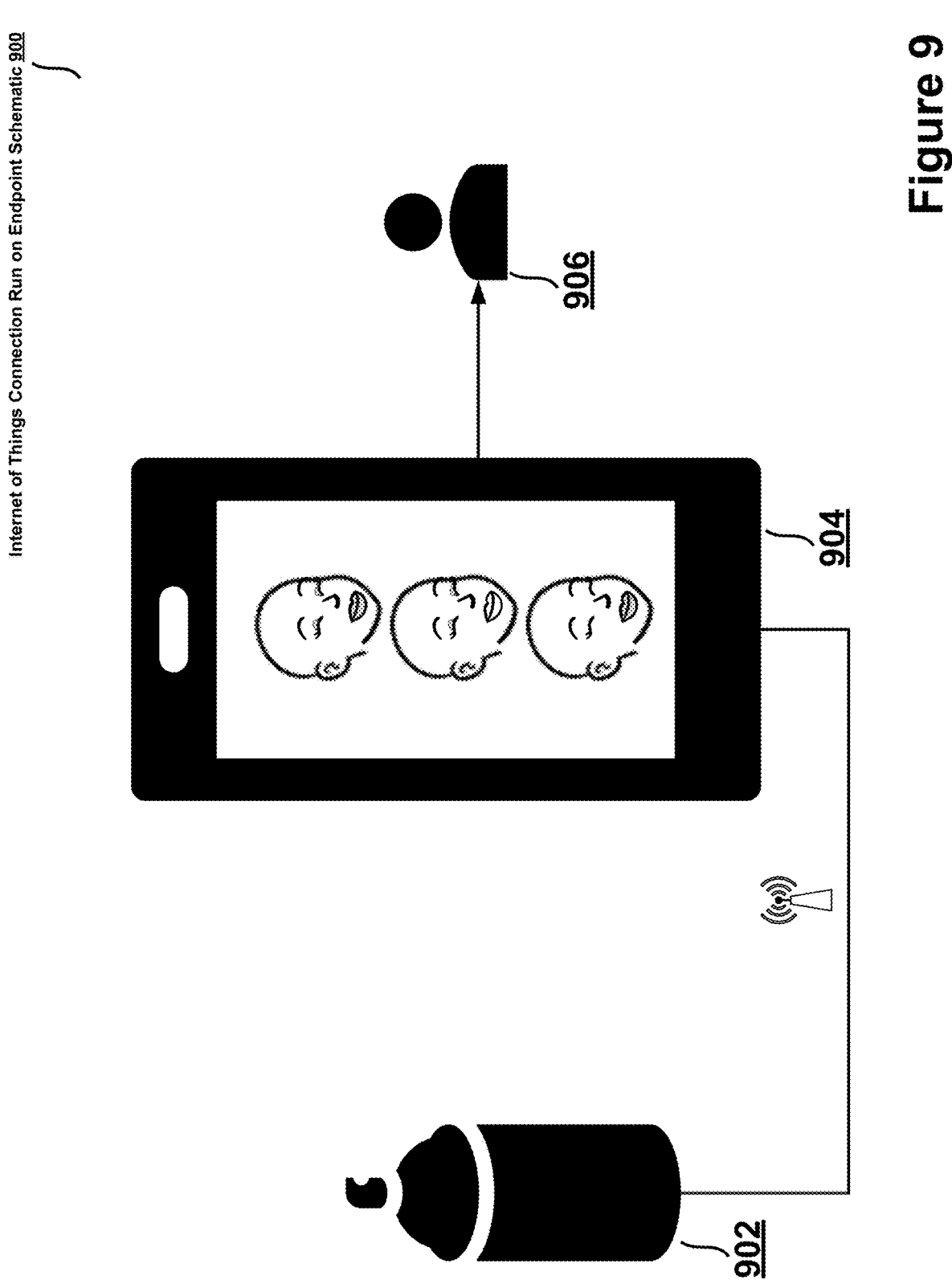
FIG. 9 is a schematic diagram of the makeup look recommendation logic and presentation logic run on an endpoint.

FIG. 9 is a schematic diagram 900 of the makeup look recommendation logic and presentation logic run on an endpoint. A cosmetic device 902 possesses a plurality of device configurations. The cosmetic device 902 is an Internet of Things device. In one implementation of the technology disclosed, cosmetic device 902 transmits data describing at least one device configuration within the plurality of device configurations corresponding to cosmetic device 902 to an end point computer such as a smart phone 904. Smart phone 904 generates makeup look recommendations as illustrated by facial maps shown on the screen of smart phone 904 to be presented towards a user 906.

Figure 10:
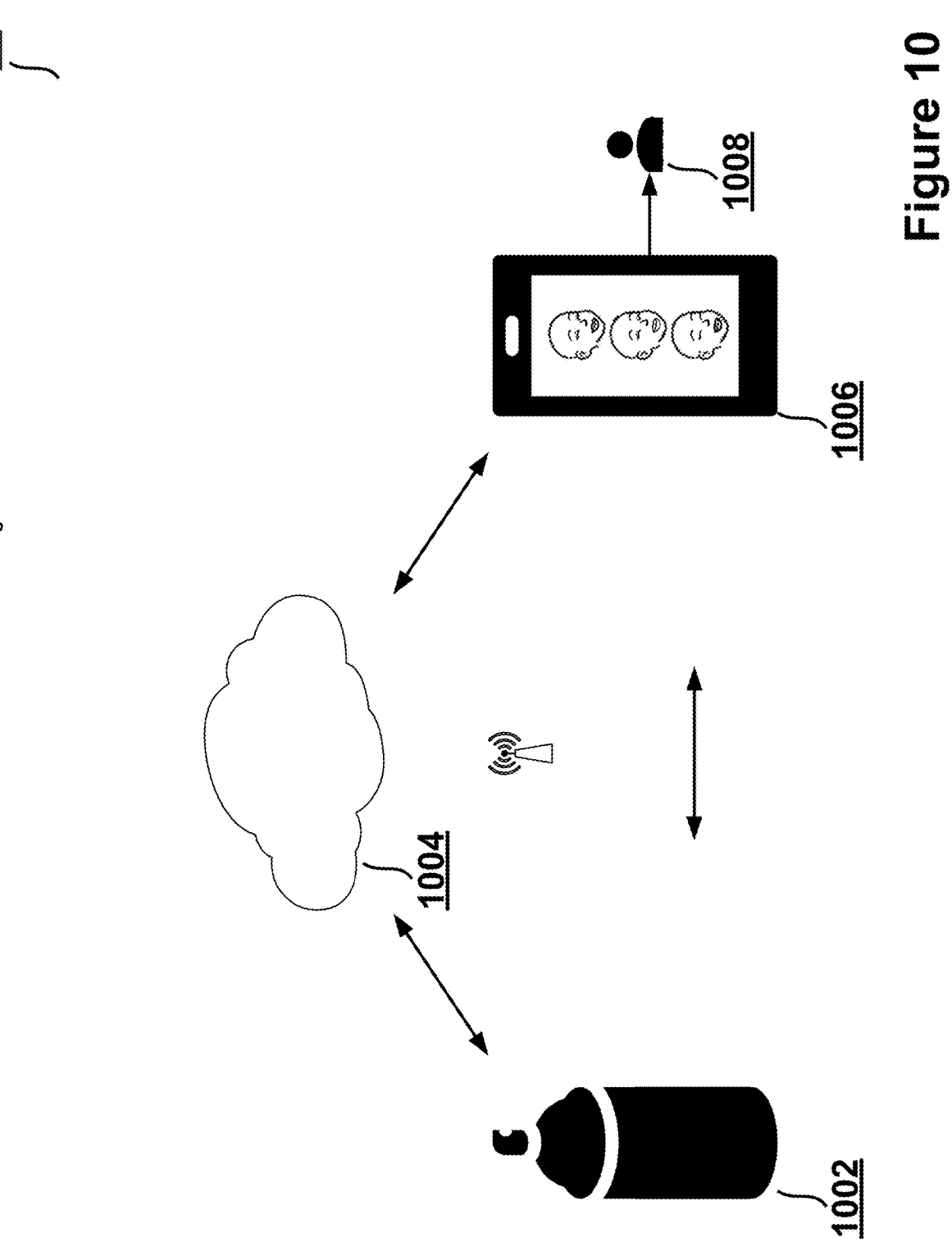
FIG. 10 is a schematic diagram of the makeup look recommendation logic and presentation logic run on a cloud environment.

FIG. 10 is a schematic diagram 1000 of the makeup look recommendation logic and presentation logic run on a cloud environment. A cosmetic device 1002 possesses a plurality of device configurations. The cosmetic device 1002 is an Internet of Things device. In one implementation of the technology disclosed, cosmetic device 1002 transmits data describing at least one device configuration within the plurality of device configurations corresponding to cosmetic device 1002 to an end point computer such as a smart phone 1006 or to a cloud environment 1004. The makeup look recommendation logic may be run on the cloud environment 1004 or smart phone 1006. The presentation logic may be run on the cloud environment 1004 or smart phone 1006. The cloud environment 1004 may also communicate with the smart phone 1006. Smart phone 1006 presents the makeup look recommendations towards a user 1008.

Selection of a Makeup Look Recommendation

A user may interact with the disclosed technology to select a particular makeup look recommendation for application based on a wide variety of criteria. The following described figures explain a plurality of the criteria for streamlined selection of a particular makeup look.

Figure 11:
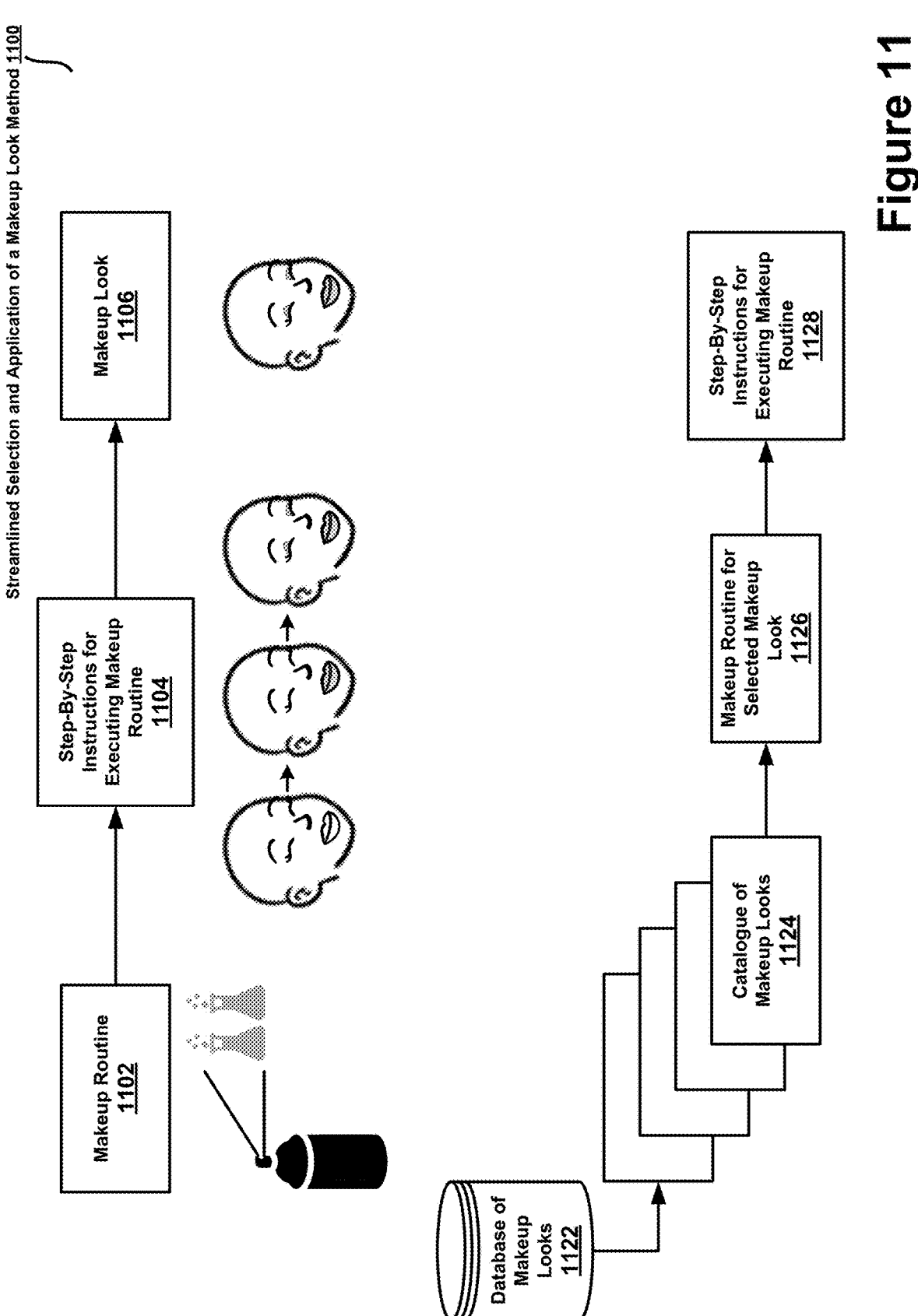
FIG. 11 contains flow diagrams describing a method for streamlined selection and application of a makeup look.

FIG. 11 contains flow diagrams 1100 describing a method for streamlined selection and application of a makeup look. A respective makeup routine 1102 having specific device configuration requirements (e.g., a spray canister, blue cosmetic substance, and pink cosmetic substance) is realized by implementing respective step-by-step instructions for executing the makeup routine 1104. In the example given in FIG. 11, the first step is illustrated by a clean fresh face in the form of a facial map. The second step illustrates placement of pink cosmetic substance in the form of lipstick when applied to the lips. The third and final step illustrates placement of blue cosmetic substance in the form of eyeshadow when applied to the eyelids. The completion of all steps results in a final realization of makeup look 1106.

A catalogue of makeup looks 1124 can be selected from a database of makeup looks 1122. In one implementation of the technology disclosed, the selected catalogue of makeup looks may be generated by a makeup look recommendation logic. In another implementation of the technology disclosed, the selected catalogue of makeup looks may be generated by a user selection. In yet another implementation of the technology disclosed, the selected catalogue of looks may be generated by a predictive algorithm wherein previously selected looks are processed as input. A makeup look may be selected from the catalogue of makeup looks 1124 wherein the respective makeup look is realized by a respective makeup routine as demonstrated by makeup routine 1102 and makeup look 1106. The makeup routine for the selected makeup look 1126 provides step-by-step instructions for executing the selected makeup routine.

Figure 12:
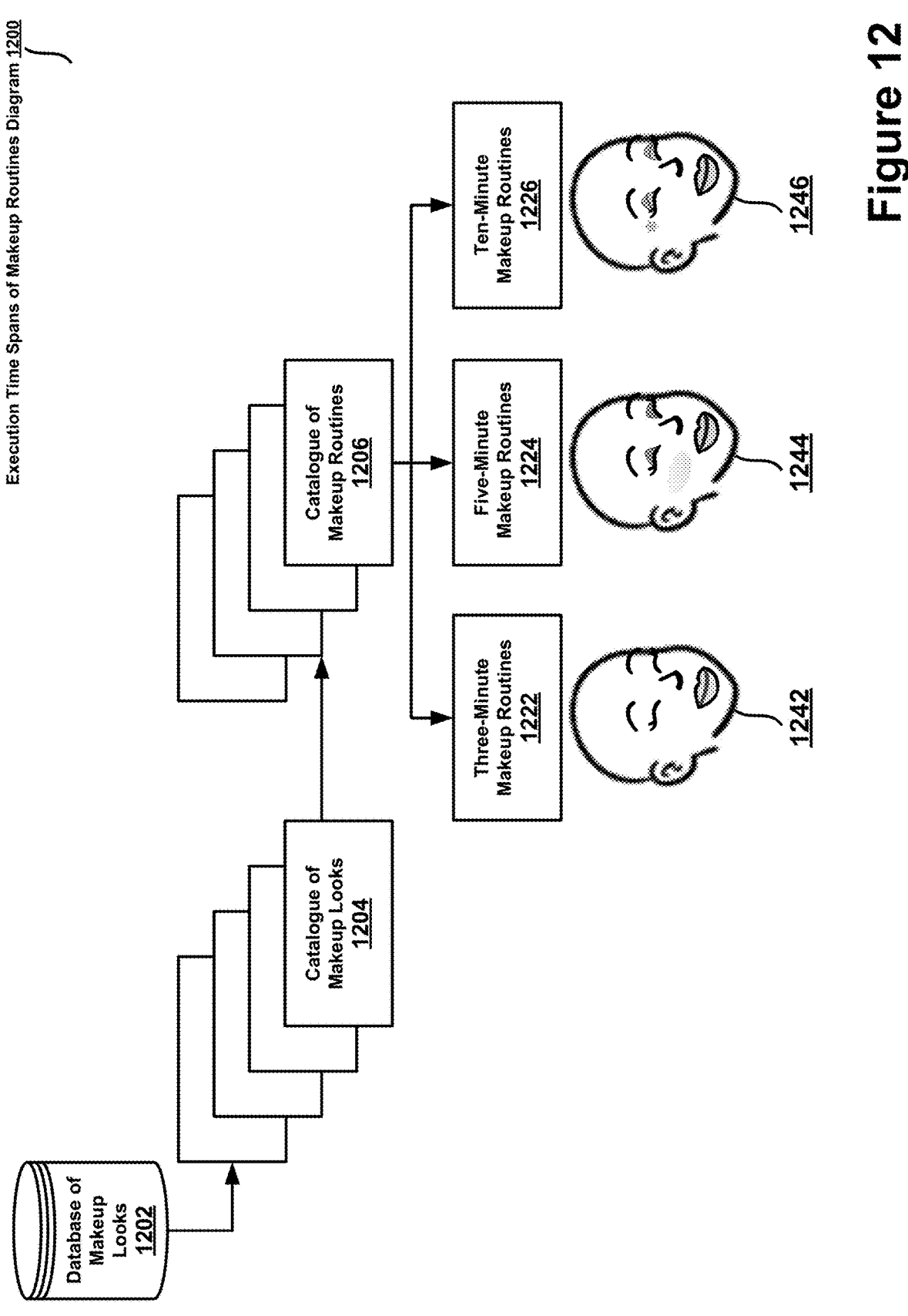
FIG. 12 contains a flow diagram describing selection of makeup routines executable within a specified time span from a catalogue of makeup routines.

FIG. 12 contains a flow diagram 1200 describing selection of makeup routines executable within a specified time span from a catalogue of makeup routines. A catalogue of makeup looks 1204 can be selected from a catalogue of makeup looks 1206. Each respective makeup look within the catalogue of makeup looks 1204 is realized by a respective makeup routine within a catalogue of makeup routines 1206. The catalogue of makeup routines 1206 can be categorized by the time spans in which a makeup routine can be executed.

For example, three-minute makeup routines 1222 can be extracted from the catalogue. Makeup look 1242 is an example of a makeup look realized by a three-minute makeup routine, wherein the only makeup application is a pink cosmetic substance applied as lipstick to the lips. Additionally, five-minute makeup routines 1224 can be extracted from the catalogue. Makeup look 1244 is an example of a makeup look realized by a five-minute makeup routine, wherein the makeup application comprises a pink cosmetic substance applied as lipstick to the lips and as blush to the cheeks and a blue cosmetic substance applied as eyeshadow to the eyelids. Finally, ten-minute makeup routines 1246 can be extracted from the catalogue. Makeup look 1246 is an example of a makeup look realized by a ten-minute makeup routine, wherein the makeup application comprises a pink cosmetic substance applied as lipstick to the lips, a red cosmetic substance and a green cosmetic substance applied as eyeshadow to the eyelids, and a blue cosmetic substance applied as a snowflake design on the skin.

A wide range of execution time spans for a particular makeup routine exist beyond the three-minute, five-minute, and ten-minute makeup routines ranging from one minute up to any number of minutes. A person skilled in the art will appreciate that three-, five-, and ten-minute time spans are expressed explicitly as examples of execution time spans, and that in other implementations, these can be any other execution time spans, such as one-minute, thirty-minutes, forty-five-minutes, and so on.

Figure 13:
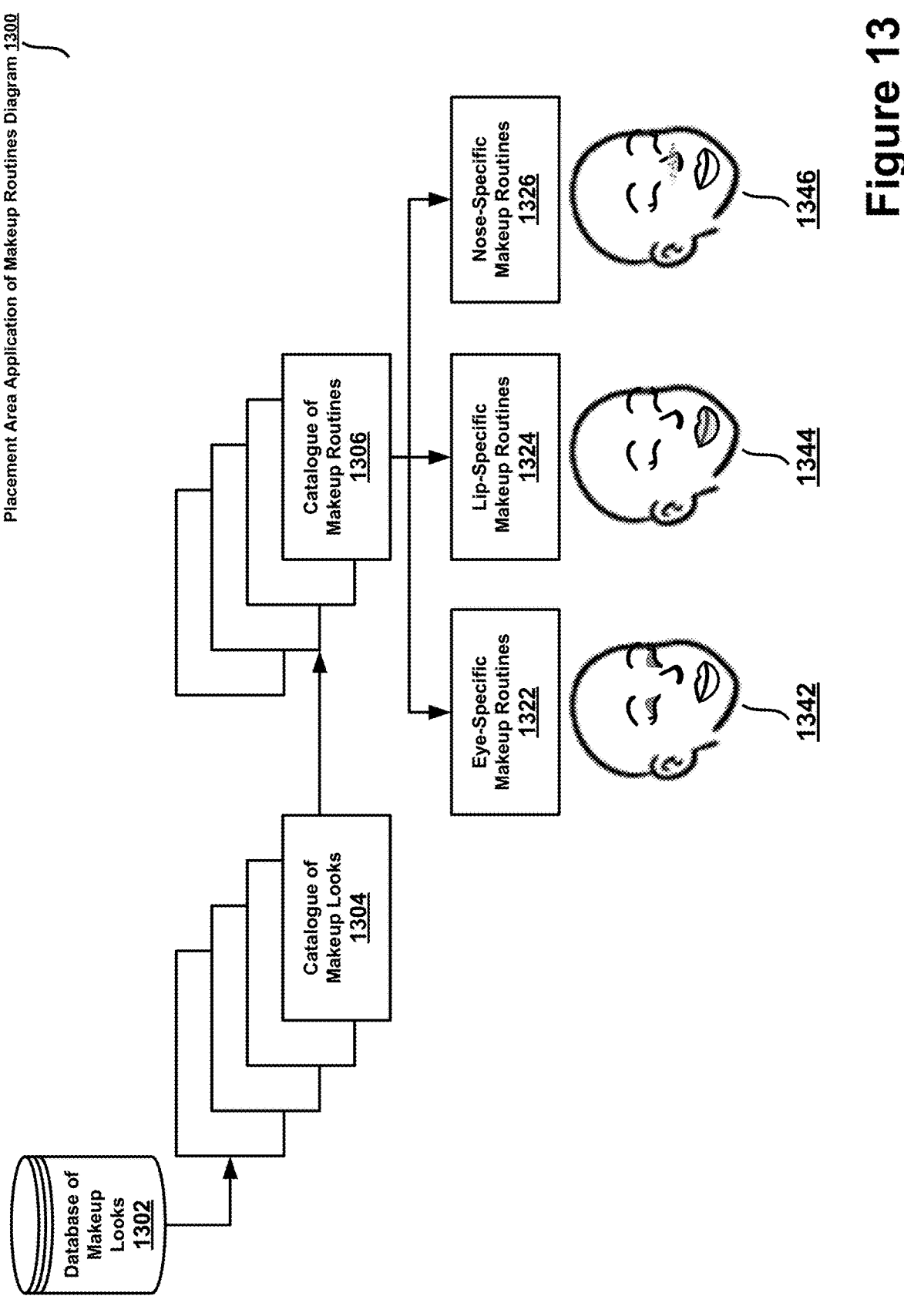
FIG. 13 contains a flow diagram describing selection of makeup routines applied to a specific placement area from a catalogue of makeup routines.

FIG. 13 contains a flow diagram 1300 describing selection of makeup routines applied to a specific placement area from a catalogue of makeup routines. A catalogue of makeup looks 1304 can be selected from a database of makeup looks 1302. Each respective makeup look within the catalogue of makeup looks 1304 is realized by a respective makeup routine within a catalogue of makeup routines 1306. The catalogue of makeup routines 1306 can be categorized by the placement area in which makeup is applied.

For example, eye-specific makeup routines 1322 can be extracted from the catalogue. Makeup look 1342 is an example of a makeup look applied to the eyes, wherein the only makeup application is a teal cosmetic substance applied as eyeshadow to the eyelids. Additionally, lip-specific makeup routines 1324 can be extracted from the catalogue. Makeup look 1344 is an example of a makeup look realized by a lip-specific makeup routine, wherein the makeup application comprises a pink cosmetic substance applied as lipstick to the lips. Finally, nose-specific makeup routines 1346 can be extracted from the catalogue. Makeup look 1346 is an example of a makeup look realized by a nose-specific makeup routine, wherein the makeup application comprises a pink glitter cosmetic substance applied as highlighter to the nose.

Additional placement areas for a particular makeup routine exist beyond the eyes, lips, and nose as illustrated in FIG. 3. A person skilled in the art will appreciate that eye-, lip- and nose-specific placement areas are expressed explicitly as examples of applicable placement areas, and that in other implementations, these can be any other placement areas, such as skin complexion coverage-specific, eyebrow-specific, eyelash-specific, and so on. Moreover, a person skilled in the art will appreciate that eye-, lip- and nose-specific placement areas are expressed explicitly as simple examples of applicable placement areas respective to one-step makeup routines and that multi-step placement area-specific routines exist in other implementations, such as skin complexion coverage- and eye-specific makeup routines, eyelid- and eyelash-specific makeup routines, and so on.

Figure 14:
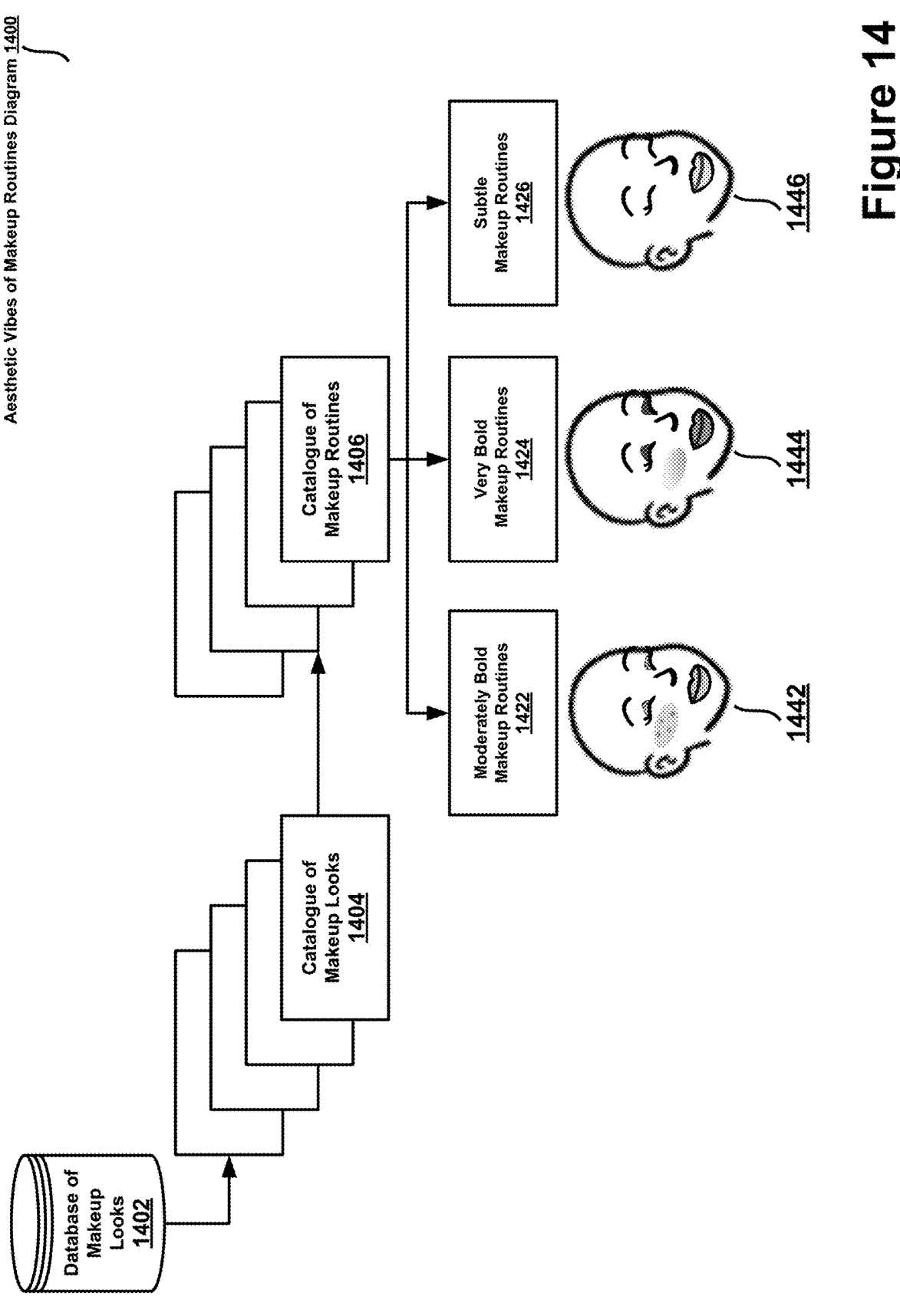
FIG. 14 contains a flow diagram describing selection of makeup routines applicable to a specific boldness level from a catalogue of makeup routines.

FIG. 14 contains a flow diagram 1400 describing selection of makeup routines applicable to a specific boldness level from a catalogue of makeup routines. A catalogue of makeup looks 1404 can be selected from a database of makeup looks 1402. Each respective makeup look within the catalogue of makeup looks 1404 is realized by a respective makeup routine within a catalogue of makeup routines 1406. The catalogue of makeup routines 1406 can be categorized by the specific boldness level applicable to a specific makeup routine.

For example, moderately bold makeup routines 1422 can be extracted from the catalogue. Makeup look 1442 is an example of a makeup look comprising pink and blue blend glitter cosmetic substance applied as eyeshadow to the eyelids, pink glitter cosmetic substance applied as highlighter to the cheeks, and pink cosmetic substance applied as lipstick to the lips. Additionally, very bold level makeup routines 1424 can be extracted from the catalogue. Makeup look 1444 is an example of a makeup look realized by an edgy boldness level makeup routine, wherein the makeup application comprises a blue cosmetic substance applied as eyeshadow to the eyes, pink cosmetic substance applied as blush to the cheeks, and purple cosmetic substance applied as lipstick to the lips. Finally, natural boldness level makeup routines 1446 can be extracted from the catalogue. Makeup look 1446 is an example of a makeup look realized by a natural boldness level makeup routine, wherein the makeup application comprises a light pink cosmetic substance applied as tinted lip balm to the lips.

Additional boldness levels for a particular makeup routine exist beyond bold, edgy, and natural. A person skilled in the art will appreciate that bold, edgy, and natural boldness levels are expressed explicitly as examples of applicable boldness levels, and that in other implementations, these can be a range of other boldness levels. Moreover, a person skilled in the art will appreciate that many boldness levels may overlap and one makeup routine can correspond to two or more boldness categorizations.

Figure 15:
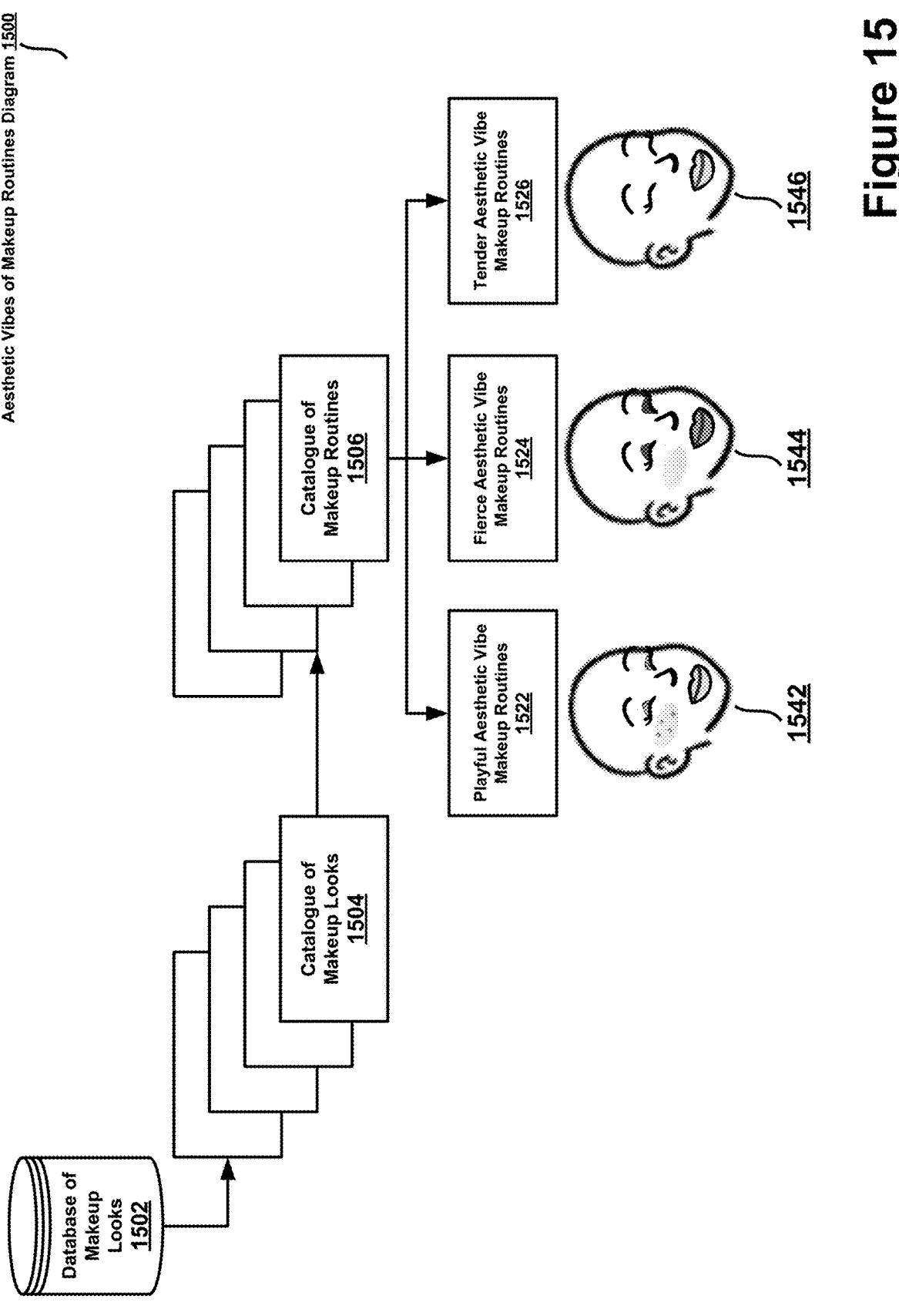
FIG. 15 contains a flow diagram describing selection of makeup routines applicable to a specific aesthetic vibe from a catalogue of makeup routines.

FIG. 15 contains a flow diagram 1500 describing selection of makeup routines applicable to a specific aesthetic vibe from a catalogue of makeup routines. A catalogue of makeup looks 1504 can be selected from a database of makeup looks 1502. Each respective makeup look within the catalogue of makeup looks 1504 is realized by a respective makeup routine within a catalogue of makeup routines 1506. The catalogue of makeup routines 1506 can be categorized by the specific aesthetic vibe applicable to a specific makeup routine.

For example, playful aesthetic vibe makeup routines 1522 can be extracted from the catalogue. Makeup look 1542 is an example of a makeup look realized by a playful aesthetic vibe makeup routine, wherein the makeup application comprises pink and blue blend glitter cosmetic substance applied as eyeshadow to the eyelids, pink glitter cosmetic substance applied as highlighter to the cheeks, and pink cosmetic substance applied as lipstick to the lips. Additionally, fierce aesthetic vibe makeup routines 1524 can be extracted from the catalogue. Makeup look 1544 is an example of a makeup look realized by an fierce aesthetic vibe makeup routine, wherein the makeup application comprises a blue cosmetic substance applied as eyeshadow to the eyes, pink cosmetic substance applied as blush to the cheeks, and purple cosmetic substance applied as lipstick to the lips. Finally, tender aesthetic vibe makeup routines 1546 can be extracted from the catalogue. Makeup look 1546 is an example of a makeup look realized by a tender aesthetic vibe makeup routine, wherein the makeup application comprises a light pink cosmetic substance applied as tinted lip balm to the lips.

Additional aesthetic vibes for a particular makeup routine exist beyond playful, fierce, and tender. A person skilled in the art will appreciate that playful, fierce, and tender aesthetic vibes are expressed explicitly as examples of applicable aesthetic vibes, and that in other implementations, these can be any other aesthetic vibes, such as free, angry, magnetic, punk, joyous, chill, and so on. Moreover, a person skilled in the art will appreciate that many aesthetic vibes may overlap and one makeup routine can correspond to two or more aesthetic vibes, such as fierce and punk, mysterious and tender, and so on.

Figure 16:
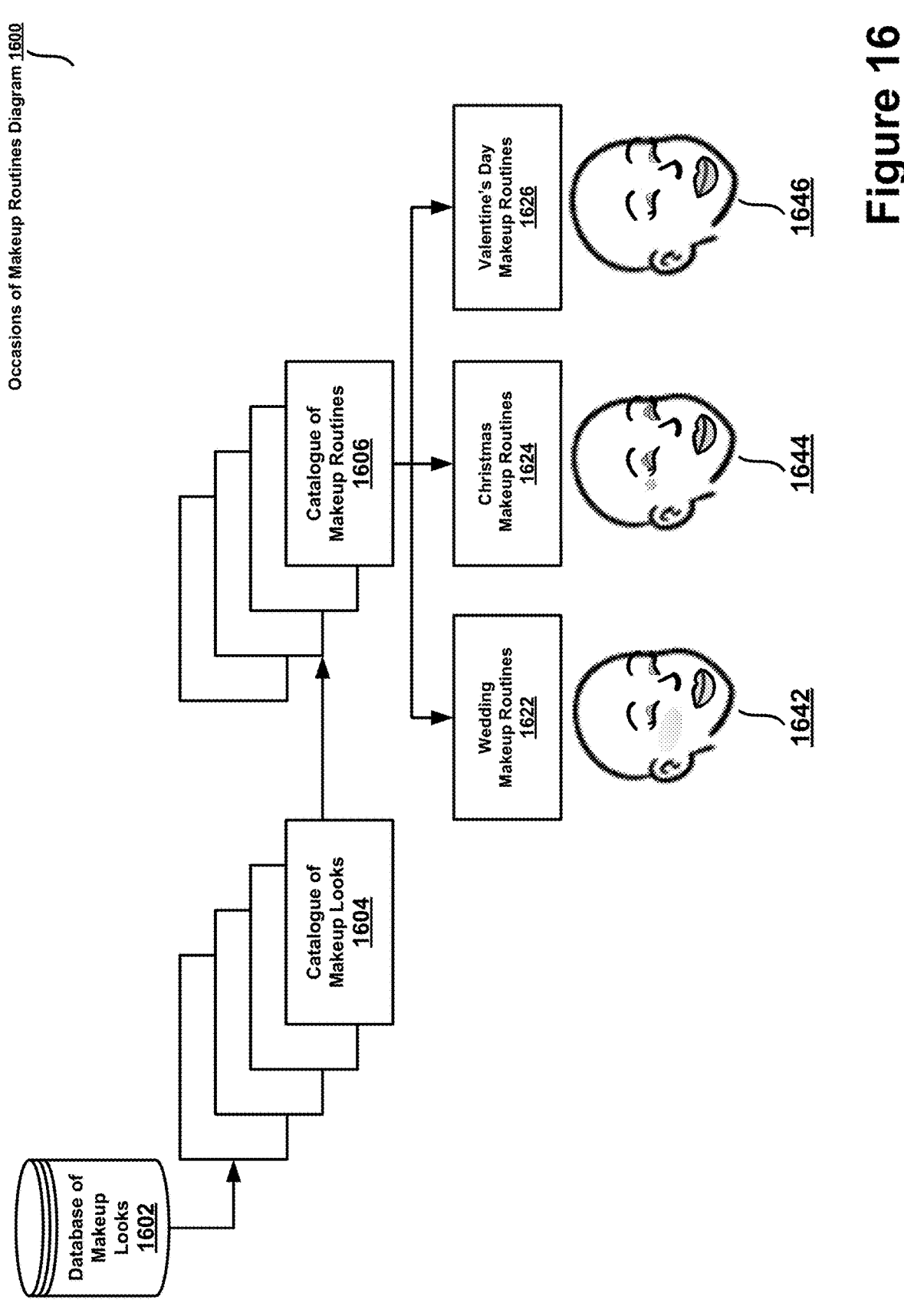
FIG. 16 contains a flow diagram describing selection of makeup routines applicable to a specific occasion from a catalogue of makeup routines.

FIG. 16 contains a flow diagram 1600 describing selection of makeup routines applicable to a specific occasion from a catalogue of makeup routines. A catalogue of makeup looks 1604 can be selected from a database of makeup looks 1602. Each respective makeup look within the catalogue of makeup looks 1604 is realized by a respective makeup routine within a catalogue of makeup routines 1606. The catalogue of makeup routines 1606 can be categorized by the specific occasion applicable to a specific makeup routine.

For example, wedding occasion makeup routines 1622 can be extracted from the catalogue. Makeup look 1642 is an example of a makeup look comprising pink cosmetic substance applied as eyeshadow to the eyelids, blush to the cheeks, and lipstick to the lips. Additionally, Christmas occasion makeup routines 1624 can be extracted from the catalogue. Makeup look 1644 is an example of a makeup look realized by a Christmas occasion makeup routine, wherein the makeup application comprises a pink cosmetic substance applied as lipstick to the lips, a red cosmetic substance and a green cosmetic substance applied as eyeshadow to the eyelids, and a blue cosmetic substance applied as a snowflake design on the skin. Finally, Valentine's Day occasion makeup routines 1646 can be extracted from the catalogue. Makeup look 1646 is an example of a makeup look realized by a Valentine's Day occasion makeup routine, wherein the makeup application comprises a hot pink cosmetic substance applied as lipstick to the lips, a red and white blend cosmetic substance applied as eyeshadow to the eyelids, and a red cosmetic substance applied as a heart design on the skin.

Additional occasions for a particular makeup routine exist beyond wedding, Christmas, and Valentine's Day. A person skilled in the art will appreciate that wedding, Christmas, and Valentine's Day occasions are expressed explicitly as examples of applicable occasions, and that in other implementations, these can be any other occasions, such as Rosh Hashanah, Diwali, graduation and so on. Moreover, a person skilled in the art will appreciate that many occasions may overlap and one makeup routine can correspond to two or more occasions, such as weddings and Valentine's Day, birthdays and graduation, and so on.

Figure 17:
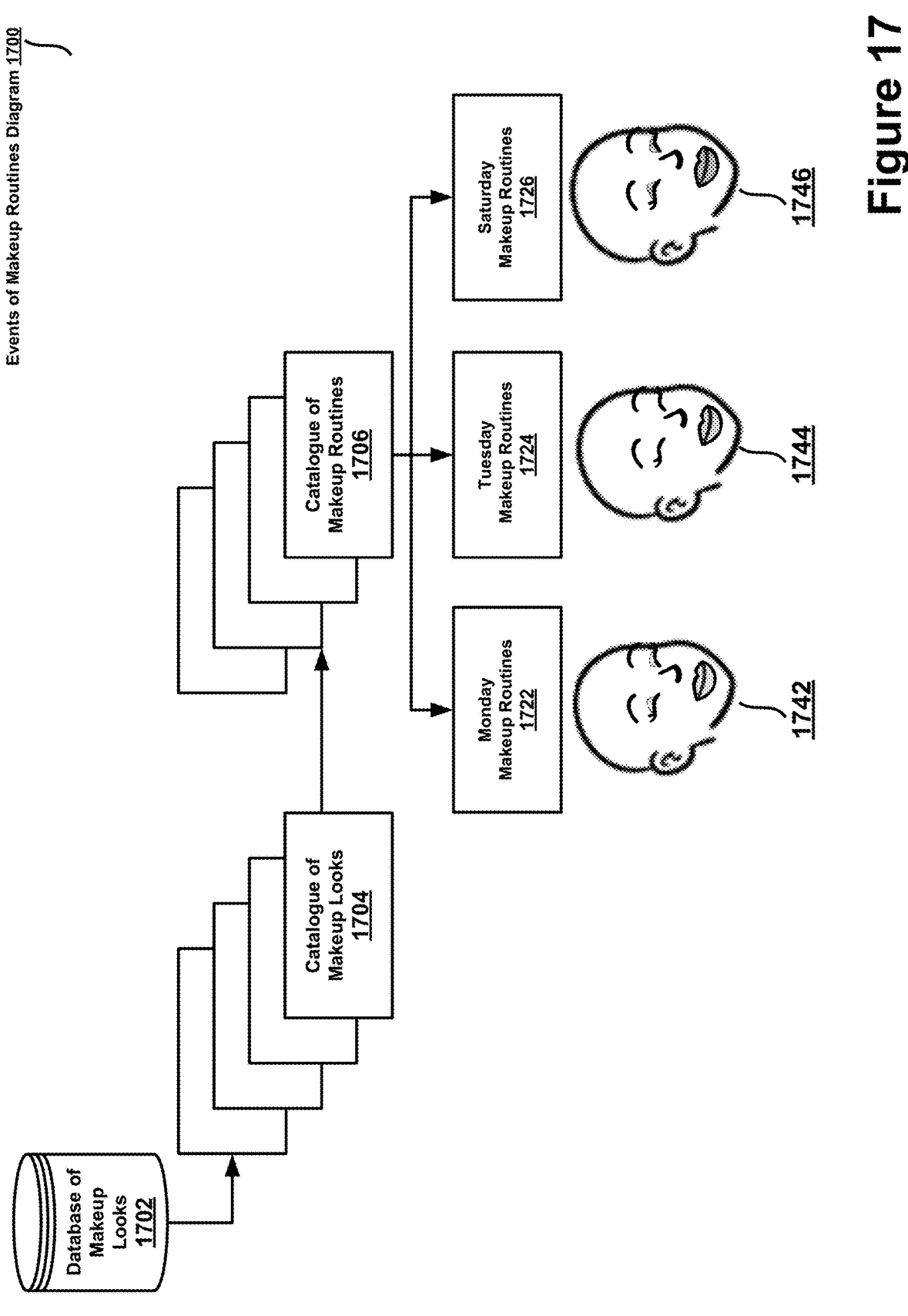
FIG. 17 contains a flow diagram describing selection of makeup routines applicable to a specific event from a catalogue of makeup routines.

FIG. 17 contains a flow diagram 1700 describing selection of makeup routines applicable to a specific event from a catalogue of makeup routines. A catalogue of makeup looks 1704 can be selected from a database of makeup looks 1702. Each respective makeup look within the catalogue of makeup looks 1704 is realized by a respective makeup routine within a catalogue of makeup routines 1706. The catalogue of makeup routines 1706 can be categorized by the specific event applicable to a specific makeup routine.

For example, Monday event makeup routines 1722 can be extracted from the catalogue. Makeup look 1742 is an example of a makeup look comprising pink cosmetic substance applied as eyeshadow to the eyelids and as lipstick to the lips. Additionally, Tuesday event makeup routines 1724 can be extracted from the catalogue. Makeup look 1744 is an example of a makeup look realized by a Tuesday event makeup routine, wherein the makeup application comprises only a pink cosmetic substance applied as lipstick to the lips. Finally, Saturday event makeup routines 1746 can be extracted from the catalogue. Makeup look 1746 is an example of a makeup look realized by a Saturday event makeup routine, wherein the makeup application comprises a purple and white blend cosmetic substance applied as eyeshadow to the eyelids, and a red cosmetic substance applied as lipstick to the lips.

Additional events for a particular makeup routine exist beyond Monday, Tuesday, and Saturday. A person skilled in the art will appreciate that Monday, Tuesday, and Saturday events are expressed explicitly as examples of applicable events, and that in other implementations, these can be any other events, such as Wednesday, Friday, Sunday and so on. Moreover, a person skilled in the art will appreciate that many events may overlap and one makeup routine can correspond to two or more events, such as Monday and Tuesday, Friday and Saturday, and so on. Additionally, as illustrated in weekly calendar 402, events for a particular makeup routine can also be specific to a specific time of a specific day, such as Tuesday morning, Saturday evening, and so on.

Figure 18:
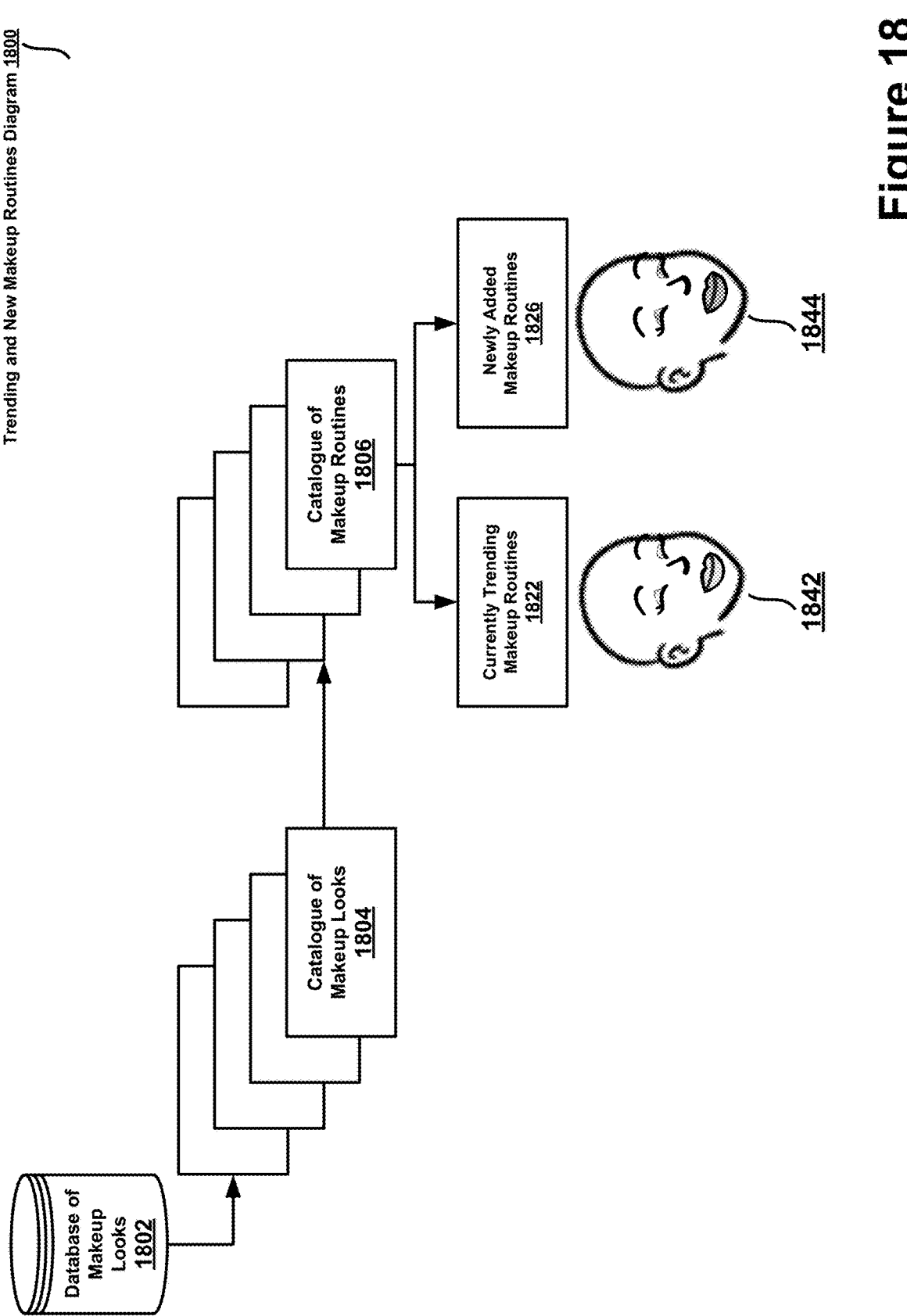
FIG. 18 contains a flow diagram describing selection of makeup routines currently trending or newly added within a catalogue of makeup routines.

FIG. 18 contains a flow diagram 1800 describing selection of makeup routines currently trending or newly added within a catalogue of makeup routines. A catalogue of makeup looks 1804 can be selected from a database of makeup looks 1802. Each respective makeup look within the catalogue of makeup looks 1804 is realized by a respective makeup routine within a catalogue of makeup routines 1806. The catalogue of makeup routines 1806 can be categorized as currently trending, wherein currently trending makeup looks are inferred from most frequently selected makeup looks in one or more online networks. The catalogue of makeup routines 1806 can also be categorized as newly added, wherein the newly added makeup looks are the most recently added makeup looks within the database of makeup looks. A makeup look can be both currently trending and newly added. A makeup look can also be neither currently trending nor newly added. A makeup look recommendation logic will prioritize newly added and/or currently trending makeup looks above looks that are not newly added or currently trending.

For example, currently trending makeup routines 1822 can be extracted from the catalogue. Makeup look 1842 is an example of a currently trending makeup look comprising pink cosmetic substance applied as eyeshadow to the eyelids and as lipstick to the lips. Additionally, newly added makeup routines 1826 can be extracted from the catalogue. Makeup look 1844 is an example of a newly added makeup look, wherein the makeup application comprises a purple and white blend cosmetic substance applied as eyeshadow to the eyelids and a red cosmetic substance applied as lipstick to the lips.

Figure 19:
FIG. 19 is an illustration of a graphical user interface presenting step-by-step instructions for a makeup routine towards a user.
Figure 19:
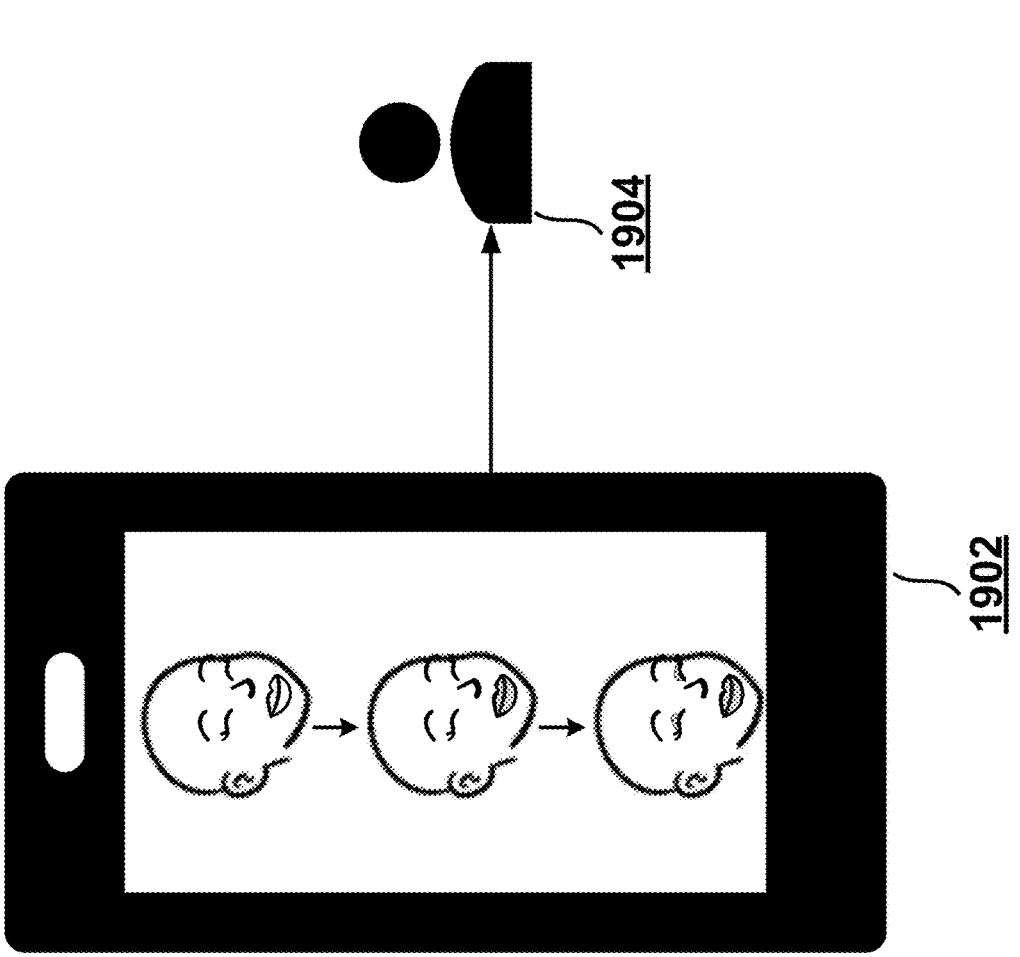

FIG. 19 is an illustration 1900 of a graphical user interface presenting step-by-step instructions for a makeup routine towards a user. A computer device with a visual component such as a smart phone 1902 presents step-by-step instructions for a particular makeup routine to realize a particular makeup look to a user 1904. The step-by-step instructions for applying the selected makeup routine include a perceivable component that provides a graphical simulation of how execution of a particular step in the step-by-step instructions is rendered. In one implementation of the technology disclosed, the instructions are rendered on a human model. In another implementation, the instructions are rendered on a virtual facial avatar. The step-by-step instructions for applying the selected makeup routine also include an operable component that provides a graphical simulation of how to operate the cosmetic device at the particular step. In some implementations of the technology disclosed, each step of the instructions is displayed in a recurring loop until the application receives user feedback to continue to the next step. As shown in Scenario C 744 within FIG. 7, the step-by-step instructions for applying the given makeup look also include a robustness component that provides a graphical narrative explaining one or more fall back application strategies available despite deviation from the particular step, or despite deviation from one or more steps in the step-by-step instructions preceding the particular step.

Computer System

Figure 20:
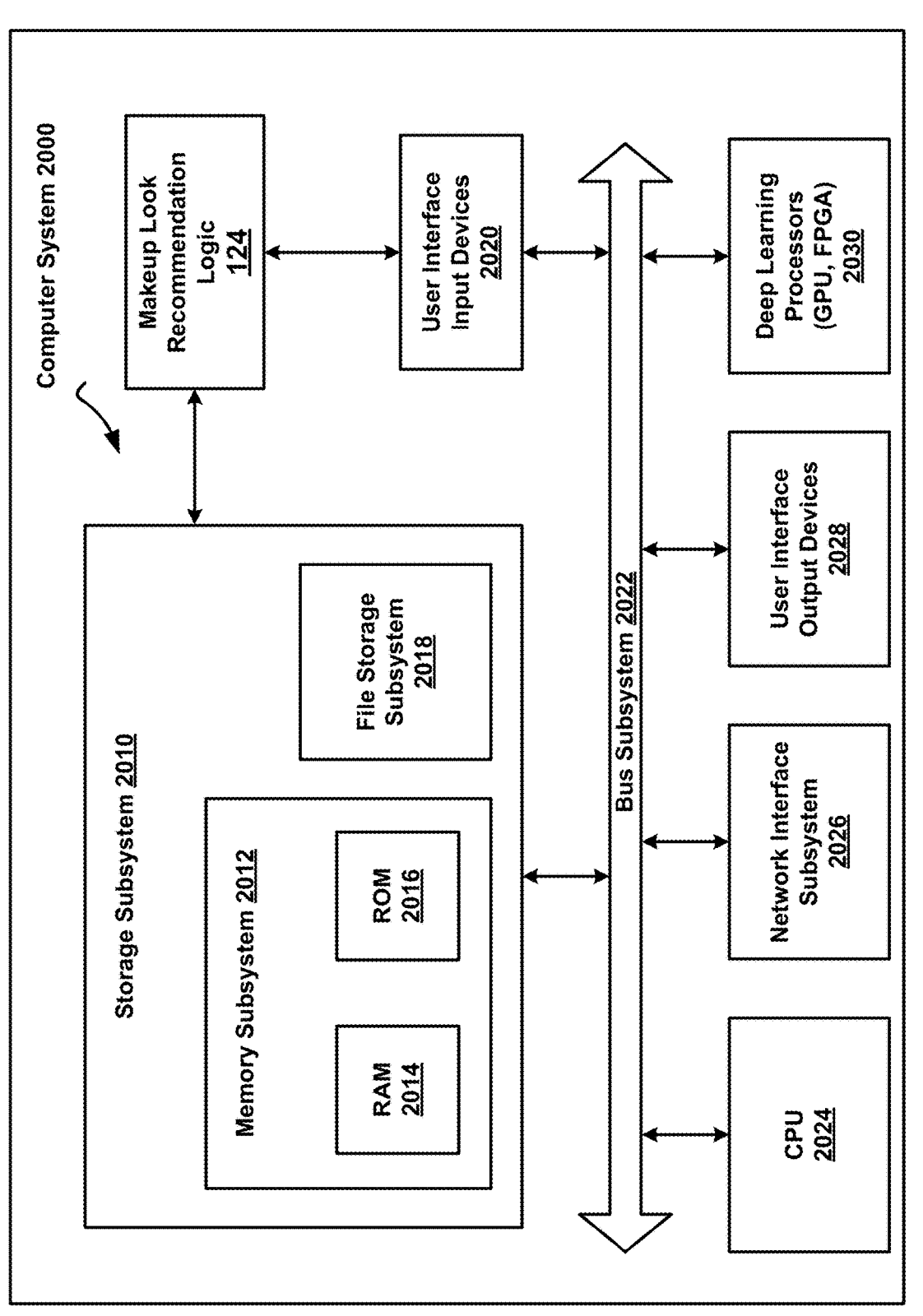
FIG. 20 shows an example computer system that can be used to implement the technology disclosed.

FIG. 20 shows an example computer system 2000 that can be used to implement the technology disclosed. Computer system 2000 includes at least one central processing unit (CPU) 2072 that communicates with a number of peripheral devices via bus subsystem 2055. These peripheral devices can include a storage subsystem 2010 including, for example, memory devices and a file storage subsystem 2036, user interface input devices 2038, user interface output devices 2076, and a network interface subsystem 2074. The input and output devices allow user interaction with computer system 2000. Network interface subsystem 2074 provides an interface to outside networks, including an interface to corresponding interface devices in other computer systems.

In one implementation, the makeup look recommendation logic 124 is communicably linked to the storage subsystem 2010 and the user interface input devices 2038.

User interface input devices 2038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2000.

User interface output devices 2076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2000 to the user or to another machine or computer system.

Storage subsystem 2010 stores programming and data constructs that provide the functionality of some or all of the modules and methods described herein. These software modules are generally executed by processors 2078.

Processors 2078 can be graphics processing units (GPUs), field-programmable gate arrays (FPGAs), application-specific integrated circuits (ASICs), and/or coarse-grained reconfigurable architectures (CGRAs). Processors 2078 can be hosted by a deep learning cloud platform such as Google Cloud Platform™, Xilinx™, and Cirrascale™. Examples of processors 2078 include Google's Tensor Processing Unit (TPU)™, rackmount solutions like GX4 Rackmount Series™, GX20 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 2022 used in the storage subsystem 2010 can include a number of memories including a main random access memory (RAM) 2032 for storage of instructions and data during program execution and a read only memory (ROM) 2034 in which fixed instructions are stored. A file storage subsystem 2036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2036 in the storage subsystem 2010, or in other machines accessible by the processor.

Bus subsystem 2055 provides a mechanism for letting the various components and subsystems of computer system 2000 communicate with each other as intended. Although bus subsystem 2055 is shown schematically as a single bus, alternative implementations of the bus subsystem can use multiple busses.

Computer system 2000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2000 depicted in FIG. 20 is intended only as a specific example for purposes of illustrating the preferred implementations of the present invention. Many other configurations of computer system 2000 are possible having more or less components than the computer system depicted in FIG. 20.

Clauses

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A computer-implemented method of streamlined selection and application of a makeup look, including:
   recommending a catalogue of makeup looks that presents respective makeup routines executable in respective time spans;
   receiving a selection of at least one makeup routine in the presented respective makeup routines; and
   providing step-by-step instructions for executing a selected makeup routine.
2. The computer-implemented method of clause 1, wherein execution of a makeup routine results in realization of a corresponding makeup look.
3. The computer-implemented method of clause 1, wherein the respective makeup routines include a ten-minute makeup look, a five-minute makeup look, and a three-minute makeup look, and wherein the respective time spans include ten minutes, five minutes, and three minutes.
4. The computer-implemented method of clause 1, further including:

recommending the catalogue of makeup looks that further presents respective makeup routines applicable to respective placement areas;
   receiving a selection of at least one makeup routine in the presented respective makeup routines; and
   providing step-by-step instructions for executing the selected makeup routine.
5. The computer-implemented method of clause 4, wherein the respective makeup routines include an eye-specific makeup look, a lip-specific makeup look, and a nose-specific makeup look, and wherein the respective placement areas include eyes, lips, and nose.
6. The computer-implemented method of clause 1, further including:
   recommending the catalogue of makeup looks that further presents respective makeup routines applicable to respective aesthetic vibes;
   receiving a selection of at least one makeup routine in the presented respective makeup routines; and
   providing step-by-step instructions for executing the selected makeup routine.
7. The computer-implemented method of clause 6, wherein the respective makeup routines include a playful makeup look, a fierce makeup look, and a tender makeup look, and wherein the respective aesthetic vibes include playful, fierce, and tender.
8. The computer-implemented method of clause 6, wherein the aesthetic vibes are inferred based on previously selected makeup routines.
9. The computer-implemented method of clause 6, wherein the aesthetic vibes are provided by a user.
10. The computer-implemented method of clause 1, further including:
   recommending the catalogue of makeup looks that further presents a plurality of makeup routines applicable by one or more previously selected makeup looks;
   receiving a selection of at least one makeup routine in the presented plurality of makeup routines; and
   providing step-by-step instructions for executing the selected makeup routine.
11. The computer-implemented method of clause 1, further including:
   recommending the catalogue of makeup looks that further presents a plurality of makeup routines applicable by one or more currently trending makeup looks;
   receiving a selection of at least one makeup routine in the presented plurality of makeup routines; and
   providing step-by-step instructions for executing the selected makeup routine.
12. The computer-implemented method of clause 11, wherein the currently trending makeup looks are inferred from most frequently selected makeup looks in one or more online networks.
13. The computer-implemented method of clause 1, further including:
   recommending the catalogue of makeup looks that further presents a plurality of makeup routines applicable by one or more newly added makeup looks;
   receiving a selection of at least one makeup routine in the presented plurality of makeup routines; and
   providing step-by-step instructions for executing the selected makeup routine.
14. The computer-implemented method of clause 1, further including:

recommending the catalogue of makeup looks that further presents respective makeup routines applicable to respective occasions;

receiving a selection of at least one makeup routine in the presented respective makeup routines; and providing step-by-step instructions for executing the selected makeup routine.

15. The computer-implemented method of clause 14, wherein the respective makeup routines include a Thanksgiving makeup look, a Christmas makeup look, and a Valentine's Day makeup look, and wherein the respective occasions include Thanksgiving, Christmas, and Valentine's Day.

16. The computer-implemented method of clause 1, further including:

recommending the catalogue of makeup looks that further presents respective makeup routines applicable to respective events;

receiving a selection of at least one makeup routine in the presented respective makeup routines; and providing step-by-step instructions for executing the selected makeup routine.

17. The computer-implemented method of clause 16, wherein the respective makeup routines include a Monday makeup look, a Tuesday makeup look, and a Wednesday makeup look, and wherein the respective events include Monday, Tuesday, and Wednesday.

18. The computer-implemented method of clause 1, further including:

recommending the catalogue of makeup looks that further presents a plurality of makeup routines realizable by a particular color;

receiving a selection of at least one makeup routine in the presented plurality of makeup routines; and providing step-by-step instructions for executing the selected makeup routine.

19. The computer-implemented method of clause 18, wherein the particular color is of a cosmetic substance currently loaded in a cartridge of a cosmetic device configured to execute the selected makeup routine.

20. The computer-implemented method of clause 19, wherein the particular color is of a cosmetic substance previously loaded in the cosmetic device.

21. The computer-implemented method of clause 20, wherein the particular color is inferred based on previously selected makeup routines.

22. The computer-implemented method of clause 21, wherein the particular color is one of multiple colors of multiple cosmetic substances concurrently loaded in multiple cartridges of the cosmetic device.

23. The computer-implemented method of clause 22, further including prioritizing recommending makeup looks applicable to a previously selected aesthetic vibe over yet-to-be-selected aesthetic vibes.

24. The computer-implemented method of clause 23, further including prioritizing recommending makeup looks realizable by a currently loaded color over a previously loaded color.

25. The computer-implemented method of clause 24, wherein the step-by-step instructions for applying the selected makeup routine include a perceivable component that provides a graphical simulation of how execution of a particular step in the step-by-step instructions is rendered on a human model.

26. The computer-implemented method of clause 25, wherein the step-by-step instructions for applying the selected makeup routine include a perceivable component that provides a graphical simulation of how execution of a particular step in the step-by-step instructions is rendered on a virtual facial avatar.

27. The computer-implemented method of clause 26, wherein the step-by-step instructions for applying the selected makeup routine include an operable component that provides a graphical simulation of how to operate the cosmetic device at the particular step.

28. The computer-implemented method of clause 26, wherein the step-by-step instructions for applying the selected makeup look include a robustness component that provides a graphical narrative explaining one or more fall back application strategies available despite deviation from the particular step, or despite deviation from one or more steps in the step-by-step instructions preceding the particular step.

29. A system including one or more processors coupled to memory, the memory loaded with computer instructions to select and apply a makeup look in a streamlined manner, the instructions, when executed on the processors, implement actions comprising:

recommending a catalogue of makeup looks that presents respective makeup routines executable in respective time spans;

receiving a selection of at least one makeup routine in the presented respective makeup routines; and providing step-by-step instructions for executing the selected makeup routine.

30. The system of clause 29, wherein execution of a makeup routine results in realization of a corresponding makeup look.

31. The system of clause 29, wherein the respective makeup routines include a ten-minute makeup look, a five-minute makeup look, and a three-minute makeup look, and wherein the respective time spans include ten minutes, five minutes, and three minutes.

32. The system of clause 29, further including:

recommending the catalogue of makeup looks that further presents respective makeup routines applicable to respective placement areas;

receiving a selection of at least one makeup routine in the presented respective makeup routines; and providing step-by-step instructions for executing the selected makeup routine.

33. The system of clause 32, wherein the respective makeup routines include an eye-specific makeup look, a lip-specific makeup look, and a nose-specific makeup look, and wherein the respective placement areas include eyes, lips, and nose.

34. The system of clause 29, further including:

recommending the catalogue of makeup looks that further presents respective makeup routines applicable to respective aesthetic vibes;

receiving a selection of at least one makeup routine in the presented respective makeup routines; and providing step-by-step instructions for executing the selected makeup routine.

35. The system of clause 34, wherein the respective makeup routines include a playful makeup look, a fierce makeup look, and a tender makeup look, and wherein the respective aesthetic vibes include playful, fierce, and tender.

36. The system of clause 34, wherein the aesthetic vibes are inferred based on previously selected makeup routines.

37. The system of clause 34, wherein the aesthetic vibes are provided by a user.

38. The system of clause 29, further including:
  recommending the catalogue of makeup looks that further presents a plurality of makeup routines applicable by one or more previously selected makeup looks;
  receiving a selection of at least one makeup routine in the presented plurality of makeup routines; and
  providing step-by-step instructions for executing the selected makeup routine.

39. The system of clause 29, further including:
  recommending the catalogue of makeup looks that further presents a plurality of makeup routines applicable by one or more currently trending makeup looks;
  receiving a selection of at least one makeup routine in the presented plurality of makeup routines; and
  providing step-by-step instructions for executing the selected makeup routine.

40. The system of clause 39, wherein the currently trending makeup looks are inferred from most frequently selected makeup looks in one or more online networks.

41. The system of clause 29, further including:
  recommending the catalogue of makeup looks that further presents a plurality of makeup routines applicable by one or more newly added makeup looks;
  receiving a selection of at least one makeup routine in the presented plurality of makeup routines; and
  providing step-by-step instructions for executing the selected makeup routine.

42. The system of clause 29, further including:
  recommending the catalogue of makeup looks that further presents respective makeup routines applicable to respective occasions;
  receiving a selection of at least one makeup routine in the presented respective makeup routines; and
  providing step-by-step instructions for executing the selected makeup routine.

43. The system of clause 42, wherein the respective makeup routines include a Thanksgiving makeup look, a Christmas makeup look, and a Valentine's Day makeup look, and wherein the respective occasions include Thanksgiving, Christmas, and Valentine's Day.

44. The system of clause 29, further including:
  recommending the catalogue of makeup looks that further presents respective makeup routines applicable to respective events;
  receiving a selection of at least one makeup routine in the presented respective makeup routines; and
  providing step-by-step instructions for executing the selected makeup routine.

45. The system of clause 44, wherein the respective makeup routines include a Monday makeup look, a Tuesday makeup look, and a Wednesday makeup look, and wherein the respective events include Monday, Tuesday, and Wednesday.

46. The system of clause 29, further including:
  recommending the catalogue of makeup looks that further presents a plurality of makeup routines realizable by a particular color;
  receiving a selection of at least one makeup routine in the presented plurality of makeup routines; and
  providing step-by-step instructions for executing the selected makeup routine.

47. The system of clause 46, wherein the particular color is of a cosmetic substance currently loaded in a cartridge of a cosmetic device configured to execute the selected makeup routine.

48. The system of clause 47, wherein the particular color is of a cosmetic substance previously loaded in the cosmetic device.

49. The system of clause 48, wherein the particular color is inferred based on previously selected makeup routines.

50. The system of clause 49, wherein the particular color is one of multiple colors of multiple cosmetic substances concurrently loaded in multiple cartridges of the cosmetic device.

51. The system of clause 50, further including prioritizing recommending makeup looks applicable to a previously selected aesthetic vibe over yet-to-be-selected aesthetic vibes.

52. The system of clause 51, further including prioritizing recommending makeup looks realizable by a currently loaded color over a previously loaded color.

53. The system of clause 52, wherein the step-by-step instructions for applying the selected makeup routine include a perceivable component that provides a graphical simulation of how execution of a particular step in the step-by-step instructions is rendered on a human model.

54. The system of clause 53, wherein the step-by-step instructions for applying the selected makeup routine include a perceivable component that provides a graphical simulation of how execution of a particular step in the step-by-step instructions is rendered on a virtual facial avatar.

55. The system of clause 54, wherein the step-by-step instructions for applying the selected makeup routine include an operable component that provides a graphical simulation of how to operate the cosmetic device at the particular step.

56. The system of clause 54, wherein the step-by-step instructions for applying the selected makeup look include a robustness component that provides a graphical narrative explaining one or more fall back application strategies available despite deviation from the particular step, or despite deviation from one or more steps in the step-by-step instructions preceding the particular step.

57. A non-transitory computer readable storage medium impressed with computer program instructions to select and apply a makeup look in a streamlined manner, the instructions, when executed on a processor, implement a method comprising:
  recommending a catalogue of makeup looks that presents respective makeup routines executable in respective time spans;
  receiving a selection of at least one makeup routine in the presented respective makeup routines; and
  providing step-by-step instructions for executing the selected makeup routine.

58. The non-transitory computer readable storage medium of clause 57, wherein execution of a makeup routine results in realization of a corresponding makeup look.

59. The non-transitory computer readable storage medium of clause 57, wherein the respective makeup routines include a ten-minute makeup look, a five-minute makeup look, and a three-minute makeup look, and wherein the respective time spans include ten minutes, five minutes, and three minutes.

60. The non-transitory computer readable storage medium of clause 57, further including:

recommending the catalogue of makeup looks that further presents respective makeup routines applicable to respective placement areas;

receiving a selection of at least one makeup routine in the presented respective makeup routines; and providing step-by-step instructions for executing the selected makeup routine.

61. The non-transitory computer readable storage medium of clause 60, wherein the respective makeup routines include an eye-specific makeup look, a lip-specific makeup look, and a nose-specific makeup look, and wherein the respective placement areas include eyes, lips, and nose.

62. The non-transitory computer readable storage medium of clause 57, further including:

recommending the catalogue of makeup looks that further presents respective makeup routines applicable to respective aesthetic vibes;

receiving a selection of at least one makeup routine in the presented respective makeup routines; and providing step-by-step instructions for executing the selected makeup routine.

63. The non-transitory computer readable storage medium of clause 62, wherein the respective makeup routines include a playful makeup look, a fierce makeup look, and a tender makeup look, and wherein the respective aesthetic vibes include playful, fierce, and tender.

64. The non-transitory computer readable storage medium of clause 62, wherein the aesthetic vibes are inferred based on previously selected makeup routines.

65. The non-transitory computer readable storage medium of clause 62, wherein the aesthetic vibes are provided by a user.

66. The non-transitory computer readable storage medium of clause 57, further including:

recommending the catalogue of makeup looks that further presents a plurality of makeup routines applicable by one or more previously selected makeup looks;

receiving a selection of at least one makeup routine in the presented plurality of makeup routines; and providing step-by-step instructions for executing the selected makeup routine.

67. The non-transitory computer readable storage medium of clause 57, further including:

recommending the catalogue of makeup looks that further presents a plurality of makeup routines applicable by one or more currently trending makeup looks;

receiving a selection of at least one makeup routine in the presented plurality of makeup routines; and providing step-by-step instructions for executing the selected makeup routine.

68. The non-transitory computer readable storage medium of clause 67, wherein the currently trending makeup looks are inferred from most frequently selected makeup looks in one or more online networks.

69. The non-transitory computer readable storage medium of clause 57, further including:

recommending the catalogue of makeup looks that further presents a plurality of makeup routines applicable by one or more newly added makeup looks;

receiving a selection of at least one makeup routine in the presented plurality of makeup routines; and providing step-by-step instructions for executing the selected makeup routine.

70. The non-transitory computer readable storage medium of clause 57, further including:

recommending the catalogue of makeup looks that further presents respective makeup routines applicable to respective occasions;

receiving a selection of at least one makeup routine in the presented respective makeup routines; and providing step-by-step instructions for executing the selected makeup routine.

71. The non-transitory computer readable storage medium of clause 70, wherein the respective makeup routines include a Thanksgiving makeup look, a Christmas makeup look, and a Valentine's Day makeup look, and wherein the respective occasions include Thanksgiving, Christmas, and Valentine's Day.

72. The non-transitory computer readable storage medium of clause 57, further including:

recommending the catalogue of makeup looks that further presents respective makeup routines applicable to respective events;

receiving a selection of at least one makeup routine in the presented respective makeup routines; and providing step-by-step instructions for executing the selected makeup routine.

73. The non-transitory computer readable storage medium of clause 72, wherein the respective makeup routines include a Monday makeup look, a Tuesday makeup look, and a Wednesday makeup look, and wherein the respective events include Monday, Tuesday, and Wednesday.

74. The non-transitory computer readable storage medium of clause 57, further including:

recommending the catalogue of makeup looks that further presents a plurality of makeup routines realizable by a particular color;

receiving a selection of at least one makeup routine in the presented plurality of makeup routines; and providing step-by-step instructions for executing the selected makeup routine.

75. The non-transitory computer readable storage medium of clause 74, wherein the particular color is of a cosmetic substance currently loaded in a cartridge of a cosmetic device configured to execute the selected makeup routine.

76. The non-transitory computer readable storage medium of clause 75, wherein the particular color is of a cosmetic substance previously loaded in the cosmetic device.

77. The non-transitory computer readable storage medium of clause 76, wherein the particular color is inferred based on previously selected makeup routines.

78. The non-transitory computer readable storage medium of clause 77, wherein the particular color is one of multiple colors of multiple cosmetic substances concurrently loaded in multiple cartridges of the cosmetic device.

79. The non-transitory computer readable storage medium of clause 78, further including prioritizing recommending makeup looks applicable to a previously selected aesthetic vibe over yet-to-be-selected aesthetic vibes.

80. The non-transitory computer readable storage medium of clause 79, further including prioritizing recommending makeup looks realizable by a currently loaded color over a previously loaded color.

81. The non-transitory computer readable storage medium of clause 80, wherein the step-by-step instructions for applying the selected makeup routine include a perceivable component that provides a graphical simulation of how execution of a particular step in the step-by-step instructions is rendered on a human model.

82. The non-transitory computer readable storage medium of clause 81, wherein the step-by-step instructions for applying the selected makeup routine include a perceivable component that provides a graphical simulation of how execution of a particular step in the step-by-step instructions is rendered on a virtual facial avatar.

83. The non-transitory computer readable storage medium of clause 82, wherein the step-by-step instructions for applying the selected makeup routine include an operable component that provides a graphical simulation of how to operate the cosmetic device at the particular step.

84. The non-transitory computer readable storage medium of clause 82, wherein the step-by-step instructions for applying the selected makeup look include a robustness component that provides a graphical narrative explaining one or more fall back application strategies available despite deviation from the particular step, or despite deviation from one or more steps in the step-by-step instructions preceding the particular step.

We claim:

1. A computer-implemented method of streamlined selection and application of a makeup look, the method implemented by a smart cosmetic device system comprising at least one Internet-of-Things (IoT) cosmetic device having one or more sensors and communicatively coupled to a computing device executing makeup recommendation logic, including:

receiving, by the computing device, device configuration data detected by the one or more sensors of the at least one IoT cosmetic device, the device configuration data identifying at least one of: cosmetic substance color, cosmetic substance volume, and cosmetic substance formula ingredients;

generating, by the makeup recommendation logic trained on user behavioral history, the catalogue of makeup looks that presents respective makeup routines executable in respective time spans, wherein the catalogue is filtered based on the device configuration data to exclude makeup routines requiring cosmetic substances unavailable in the at least one IoT cosmetic device;

receiving a selection of at least one makeup routine in the presented respective makeup routines; and providing step-by-step instructions for executing a selected makeup routine, the instructions comprising a graphical user interface displaying, for the selected makeup routine, a simulation of makeup application on a user's face.

2. The computer-implemented method of claim 1, wherein execution of a makeup routine results in realization of a corresponding makeup look.

3. The computer-implemented method of claim 1, wherein the respective makeup routines include a ten-minute makeup look, a five-minute makeup look, and a three-minute makeup look, and wherein the respective time spans include ten minutes, five minutes, and three minutes.

4. The computer-implemented method of claim 1, further including:

recommending the catalogue of makeup looks that further presents respective makeup routines applicable to respective placement areas;

receiving a selection of at least one makeup routine in the presented respective makeup routines; and providing step-by-step instructions for executing the selected makeup routine.

5. The computer-implemented method of claim 4, wherein the respective makeup routines include an eye-specific makeup look, a lip-specific makeup look, and a nose-specific makeup look, and wherein the respective placement areas include eyes, lips, and nose.

6. The computer-implemented method of claim 1, further including:

recommending the catalogue of makeup looks that further presents respective makeup routines applicable to respective aesthetic vibes;

receiving a selection of at least one makeup routine in the presented respective makeup routines; and providing step-by-step instructions for executing the selected makeup routine.

7. The computer-implemented method of claim 6, wherein the respective makeup routines include a playful makeup look, a fierce makeup look, and a tender makeup look, and wherein the respective aesthetic vibes include playful, fierce, and tender.

8. The computer-implemented method of claim 6, wherein the aesthetic vibes are inferred based on previously selected makeup routines.

9. The computer-implemented method of claim 6, wherein the aesthetic vibes are provided by a user.

10. The computer-implemented method of claim 1, further including:

recommending the catalogue of makeup looks that further presents a plurality of makeup routines applicable by one or more previously selected makeup looks;

receiving a selection of at least one makeup routine in the presented plurality of makeup routines; and providing step-by-step instructions for executing the selected makeup routine.

11. The computer-implemented method of claim 1, further including:

recommending the catalogue of makeup looks that further presents a plurality of makeup routines applicable by one or more currently trending makeup looks;

receiving a selection of at least one makeup routine in the presented plurality of makeup routines; and providing step-by-step instructions for executing the selected makeup routine.

12. The computer-implemented method of claim 11, wherein the currently trending makeup looks are inferred from most frequently selected makeup looks in one or more online networks.

13. The computer-implemented method of claim 1, further including:

recommending the catalogue of makeup looks that further presents a plurality of makeup routines applicable by one or more newly added makeup looks;

receiving a selection of at least one makeup routine in the presented plurality of makeup routines; and providing step-by-step instructions for executing the selected makeup routine.

14. The computer-implemented method of claim 1, further including:

recommending the catalogue of makeup looks that further presents respective makeup routines applicable to respective occasions;

receiving a selection of at least one makeup routine in the presented respective makeup routines; and providing step-by-step instructions for executing the selected makeup routine.

15. The computer-implemented method of claim 14, wherein the respective makeup routines include a Thanksgiving makeup look, a Christmas makeup look, and a Valentine's Day makeup look, and wherein the respective occasions include Thanksgiving, Christmas, and Valentine's Day.

16. The computer-implemented method of claim 1, further including:

recommending the catalogue of makeup looks that further presents respective makeup routines applicable to respective events;

receiving a selection of at least one makeup routine in the presented respective makeup routines; and providing step-by-step instructions for executing the selected makeup routine.

17. The computer-implemented method of claim 16, wherein the respective makeup routines include a Monday makeup look, a Tuesday makeup look, and a Wednesday makeup look, and wherein the respective events include Monday, Tuesday, and Wednesday.

18. The computer-implemented method of claim 1, further including:

recommending the catalogue of makeup looks that further presents a plurality of makeup routines realizable by a particular color;

receiving a selection of at least one makeup routine in the presented plurality of makeup routines; and providing step-by-step instructions for executing the selected makeup routine.

19. A system comprising at least one Internet-of-Things (IoT) cosmetic device comprising one or more sensors configured to detect device configuration data identifying at least one of: cosmetic substance color, cosmetic substance volume, and cosmetic substance formula ingredients;

one or more processors coupled to memory, the memory loaded with computer instructions comprising makeup recommendation logic trained on user behavioral history to select and apply a makeup look in a streamlined manner, the instructions, when executed on the processors, implement actions comprising:

receiving, from the at least one IoT cosmetic device, the device configuration data detected by the one or more sensors;

generating, by the makeup recommendation logic trained on user behavioral history, the catalogue of makeup looks that presents respective makeup routines executable in respective time spans, wherein the catalogue is filtered based on the received device configuration data to exclude makeup routines requiring cosmetic substances unavailable in the at least one IoT cosmetic device;

receiving a selection of at least one makeup routine in the presented respective makeup routines; and providing step-by-step instructions for executing a selected makeup routine, the instructions comprising a graphical user interface displaying, for the selected makeup routine, a simulation of makeup application on a user's face.

20. A non-transitory computer readable storage medium impressed with computer program instructions comprising makeup recommendation logic trained on user behavioral history to select and apply a makeup look in a streamlined manner in a smart cosmetic device system comprising at least one Internet-of-Things (IoT) cosmetic device having one or more sensors, the instructions, when executed on a processor, implement a method comprising:

receiving, via the at least one IoT cosmetic device, device configuration data detected by one or more sensors and identifying at least one of: cosmetic substance color, cosmetic substance volume, and cosmetic substance formula ingredients;

generating, by the makeup recommendation logic trained on user behavioral history, the catalogue of makeup looks that presents respective makeup routines executable in respective time spans, wherein the catalogue is filtered based on the device configuration data to exclude makeup routines requiring cosmetic substances unavailable in the at least one IoT cosmetic device;

receiving a selection of at least one makeup routine in the presented respective makeup routines; and providing step-by-step instructions for executing a selected makeup routine, the instructions comprising a graphical user interface displaying, for the selected makeup routine, a simulation of makeup application on a user's face.

* * * * *